US007942821B2

(12) United States Patent
Umemura et al.

(10) Patent No.: US 7,942,821 B2
(45) Date of Patent: May 17, 2011

(54) DOPPLER VELOCITY DETECTION DEVICE AND ULTRASONOGRAPHIC DEVICE USING THE SAME

(75) Inventors: Shin-ichiro Umemura, Muko (JP); Takashi Azuma, Kawasaki (JP); Tetsuya Hayashi, Kashiwa (JP)

(73) Assignee: Hitachi Medical Corporation, Tokyo (JP)

( * ) Notice: Subject to any disclaimer, the term of this patent is extended or adjusted under 35 U.S.C. 154(b) by 1151 days.

(21) Appl. No.: 10/580,225

(22) PCT Filed: Jul. 9, 2004

(86) PCT No.: PCT/JP2004/010157
§ 371 (c)(1),
(2), (4) Date: May 22, 2006

(87) PCT Pub. No.: WO2005/051203
PCT Pub. Date: Jun. 9, 2005

(65) Prior Publication Data
US 2007/0167791 A1    Jul. 19, 2007

(30) Foreign Application Priority Data
Nov. 27, 2003  (JP) ................................ 2003-397074

(51) Int. Cl.
*A61B 8/00* (2006.01)
(52) U.S. Cl. ........ 600/455; 600/453; 600/454; 600/456; 600/457; 600/437
(58) Field of Classification Search .................. 600/455, 600/454, 453, 456, 457, 437, 407
See application file for complete search history.

(56) References Cited

U.S. PATENT DOCUMENTS

| 5,228,009 A | * | 7/1993 | Forestieri et al. | ............. 367/135 |
| 5,315,562 A | * | 5/1994 | Bradley et al. | ................. 367/89 |
| 5,570,691 A | * | 11/1996 | Wright et al. | ................. 600/447 |
| 5,622,174 A | * | 4/1997 | Yamazaki | ..................... 600/441 |

FOREIGN PATENT DOCUMENTS
JP     04-084953     3/1992

OTHER PUBLICATIONS
IEEE Transactions on Ultrasonics, Ferroelectrics, and Frequency Control, vol. 42, p. 927-937 (1995).

* cited by examiner

*Primary Examiner* — Tse Chen
*Assistant Examiner* — Joel F Brutus
(74) *Attorney, Agent, or Firm* — Antonelli, Terry, Stout & Kraus, LLP.

(57) ABSTRACT

The present invention realizes a Doppler velocity detecting technique capable of performing velocity detection and analysis with a suppressed error while excellently distinguishing a clutter signal, and provides an ultrasonographic device using the technique. In a Doppler velocity detection device comprising means for transmitting/receiving pulse waves to/from a subject a plurality of times, and velocity analyzing means for analyzing a velocity of a moving reflector in the subject on the basis of a reception echo signal, the velocity analyzing means obtains a complex expansion coefficient by linearly connecting an expansion coefficient of an even-numbered degree term and an expansion coefficient of an odd-numbered degree term which is different from the even-numbered degree term by one degree, derived when reception echo time-series signals obtained by arranging reception echo signals of equal lapse time from pulse transmission times in order of the transmission times are expanded as components of a Legendre polynomial starting from the 0th degree, by using an imaginary unit as a coefficient, and obtains a signed velocity signal of a moving reflector in the subject on the basis of-the ratio between the magnitude of each complex expansion coefficient and the magnitude of an interval between the complex expansion coefficients.

10 Claims, 31 Drawing Sheets

PHASE ROTATION VELOCITY CORRESPONDING
TO BLOOD FLOW VELOCITY/SAMPLING
ANGULAR FREQUENCY

DOPPLER VELOCITY DETECTION DEVICE AND ULTRASONOGRAPHIC DEVICE USING THE SAME

TECHNICAL FIELD

The present invention relates to an ultrasonographic technique such as an ultrasonic Doppler blood flowmeter or a blood flow drawing device for medical diagnosis that detects a moving reflector such as a blood flow in a living body by transmitting/receiving ultrasonic waves to/from a living body and displays a distribution of velocity and a spatial distribution of velocity.

BACKGROUND ART

A pulse Doppler device transmits/receives waves such as pulse ultrasonic waves or electromagnetic waves to/from an object and analyzes time-series signals obtained by arranging signals of a particular point of time with equal lapse time from pulse transmission times of a plurality of received echo signals as shown in FIG. 1 in order of the transmission times, thereby obtaining information such as velocity of a moving object. The most common signal processing method performs quadrature detection on the reception signals and analyzes them as complex time-series signals. Such a pulse Doppler device is widely used as an ultrasonographic device for detecting and drawing a blood flow or the like in a living body, a meteorological radar for detecting and drawing rain clouds, an airborne radar for detecting a flying object, or the like.

If only one reflector exists, a motion velocity "v" of the reflector approaching or moving away from a transmitter/receiver can be easily obtained as follows using a phase rotation velocity $\lambda\Delta\Phi/\Delta t$ of the time-series signals, that is, a signed angular frequency.

$$v=\lambda\Delta\Phi/\Delta t/2\pi \quad (1)$$

where $\lambda$ denotes wavelength, $\Delta t$ denotes time interval of pulse transmissions, and $\Delta\Phi$ denotes a phase rotation angle. In the case where the reflector approaches, the sign "v" is positive. In the case where the reflector moves away, the sign "v" is negative.

In a reception echo of an actual pulse Doppler device as described above, however, the strength of an echo signal from a stationary reflector or so-called clutter signal is generally higher than that of an echo signal from a target moving reflector by a few digits. Consequently, only by simply applying the process of the equation (1) to the time-series signals, a moving reflector cannot be detected. An actual pulse Doppler device is therefore constructed to suppress an echo signal from a stationary reflector, perform a signal process called an MTI (Moving Target Indicator) process of relatively emphasizing an echo signal from a moving reflector and, after that, detect or analyze velocity.

In "IEEE Transactions on Ultrasonics, Ferroelectrics, and Frequency Control", Vol. 42, pp 927-937, 1995, a polynomial regression filter is proposed. The polynomial regression filter is a process of sequentially least-square fitting expressions of the 0th order (constant), the 1st order, the 2nd order, . . . , and the Mth order to the time-series signals and eliminating fit components, thereby eliminating drift components of the original time-series signals.

DISCLOSURE OF THE INVENTION

The most well-known process as an MTI process is a process using a normal low-frequency cutoff filter expressed by a sum of product of convolution in a time domain. The process, however, has the following drawbacks.

1) In the case of using a low-frequency cutoff filter to which $N_1$ time-series data points are input, the number of data points input to a velocity detecting/analyzing process unit at a post stage is reduced by $(N_1-1)$.
2) A filter of a sharp cutoff characteristic is not easily obtained.

An echo signal from a stationary reflector is not actually completely stationary on the time base but drifts due to fluctuations of media in some midpoints and, in the case of an ultrasonograhpic device for medical use, due to slow movement of stationary organs other than blood flow. Therefore, frequency components of an echo signal from a stationary reflector includes not only a direct current component whose phase rotation velocity is zero but also a low frequency component whose phase rotation velocity is not zero. A cutoff characteristic to eliminate the low frequency component is necessary while maintaining an echo signal from a moving reflector, so that the above-described point 2) becomes a problem. If a low-frequency cutoff filter is used when the velocity detecting/analyzing process is performed on the basis of time-series signals at N points obtained by N times of transmitting/receiving operations, the above-described point 1) means that the data points which can be actually used for the velocity detecting/analyzing computation decreases to $(N-N_1+1)$ points. It is not desirable in an application in which real time performance is important like in an ultrasonographic blood flow drawing device for medical diagnosis.

As a process that solves the problem, the polynomial regression filter has been proposed. The process is expressed by multiplying input time-series signals at N points by an N×N matrix. Therefore, time-series signals at the same N points are obtained as output signals so that 1) the number of data points is not reduced and
2) the low-frequency cutoff characteristic, although it depends on the maximum degree M of fitting, is much sharper than that of the conventional filter having an equivalent cutoff frequency.

However, when the velocity of a moving object is detected and analyzed by a conventional method of the kind expressed by the above equation (1) in a later stage of the process performed by the polynomial regression filter, a problem occurs such that a velocity computation error around the cutoff frequency is larger as compared with that in a conventional filter. Consequently, in the case where precision of velocity as a result of the detection/analysis is requested to some extent, a signal of a moving object in a frequency band of a portion extended to a low band cannot be used due to the sharp cut off characteristic of the polynomial regression filter. That is, in this case, the advantage of 2) cannot be sufficiently utilized.

In view of the problems of the present pulse Doppler device, an object of the present invention is to realize a Doppler velocity detecting technique capable of performing velocity detection/analysis while suppressing an error while excellently distinguishing a clutter signal, and to provide an ultrasonographic device using the technique.

To substantially solve the problems of the invention, first, the function of an MTI filter which blocks a clutter signal and its necessity will be further examined. As a concrete example, the case of conducting a velocity analysis from time-series complex signals at N points will be considered. Typical time-series complex signals for analyzing pulse Doppler velocity are obtained as follows. A set of signals derived by multiplying a received echo signal with two carrier frequency signals whose phases are different from each other by 90° by using an imaginary unit as a coefficient are linearly connected, thereby obtaining a complex signal. Parts having the same phase with reference to transmission times of the pulses are arranged in order of the transmission times.

Common means in analysis of the frequency or phase of such a discrete time-series signal is discrete Fourier expansion. Concretely, time-series signals arranged as $n=1, \ldots,$ and N are expanded with the following complex sine wave of an index $k=-N/2, \ldots, 0, \ldots, N/2$ indicative of frequency.

$$Cs(n, k)=\cos [k\pi(2n-N-1)/N]+j \sin [k\pi(2n-N-1)/N] \quad (2)$$

where j denotes an imaginary unit, negative k corresponds to velocity in the moving-away direction, and positive k corresponds to velocity in the approaching direction. $k=\pm N/2$ shows the Nyquist limit and the sign which is positive or negative is not distinguished. Therefore, among the (N+1) complex sine wave functions expressed by the equation (2), the number of independent functions is N, and the N functions form an orthogonal function system.

On assumption that only one reflector exists and moves at a constant velocity in the Nyquist limit range, a discrete Fourier expansion coefficient which is derived by the expansion was calculated as a function of motion velocity, and the absolute value of the case where N=8 was plotted as shown in FIG. 2. The horizontal axis indicates phase rotation velocity corresponding to motion velocity in unit of $2\pi$ times of a reciprocal PRF (Pulse Repetition Frequency) of the pulse transmission time interval. In FIG. 2, eight functions indicative of expansion coefficients are shown so as to overlap each other. Four functions out of the eight functions are shown in FIG. 3 and the other four functions are shown in FIG. 4 by using distinctive lines.

At a motion velocity at which the phase rotates an integer number of times during time of N times as long as the transmission time interval, there is only one expansion coefficient which is not zero, and all of the other expansion coefficients are zero, so that a velocity analysis is made neatly. At the other general motion velocities at which the number of phase rotations is not an integer, the absolute value of each of expansion coefficients is about 1/10 of the peak even at motion velocities far from the peak on the horizontal axis. It means that a velocity analyzer has a remote crosstalk of about −20 dB. When a clutter signal having an amplitude which is incomparably larger than that of a moving reflector echo to be detected/analyzed drifts, a serious problem arises.

The problem can be considerably suppressed by applying a weight of a window function which gently rises and falls like a Hanning function but cannot be substantially solved. The method produces undesirable effects similar to the effect that the number of time-series signals is largely reduced, so that it is not suitable to the case where the number of time-series signals is originally small.

As a concrete example, a case will be considered in which a moving reflector to be detected/analyzed moving at a constant velocity of 2/3 of the Nyquist limit exists, and a clutter signal having an amplitude of 1,000 times as large as that of an echo signal from the moving reflector drifts at a velocity of 1/100 of the Nyquist limit velocity. FIG. 5 shows a velocity spectrum as an output of the velocity analyzer in this case. The spectrum of the moving reflector to be detected/analyzed is masked with a crosstalk component of the clutter signal having a peak around the velocity zero and cannot be detected in the output spectrum.

This is the most substantial reason why the MTI filter for blocking a clutter signal is necessary. A typical example of the pass amplitude characteristic of a normal low-frequency cutoff filter expressed by a sum of product of convolution in a time domain, which is the most well known MTI process, is indicated by the solid line in FIG. 6. When time series signals $S_1(n_1)$ arranged as $n_1=1, \ldots, N+M-1$ are input to such a filter, time-series signals $S_O(n_O)$ arranged as $n_O=1, \ldots, N$ are obtained as outputs.

$$S_0(n_0)=\Sigma F(m)S_1(n_0+m-1) \quad (3)$$

where S denotes the sum of $m=1, \ldots, M$. In FIG. 6, the simplest case where M=3, F(1)=−1, F(2)=2, and F(3)=−1 is shown by the solid line as a low-frequency cutoff filter. When input signals similar to those in the case of FIG. 5 are passed to the low-frequency cutoff filter and a velocity analysis is conducted in a manner similar to the case of FIG. 5, the result is as shown by the solid line in FIG. 7. As a result of suppressing the amplitude of a clutter signal to about 1/2000 by the action of the low-frequency cutoff filter, the spectrum of a moving reflector having the peak at the velocity of 0.3 to 0.4 time of the Nyquist limit can be seen.

The broken line in FIG. 6 shows a typical example of a pass amplitude characteristic when the polynomial regression filter is designated as an MTI filter for the same purpose. In the example, a clutter signal is estimated by fitting of the 0th to 3rd equations and subtracted from an input signal. A low-frequency cutoff characteristic sharper than that of the convolutional filter can be seen. The result of passing input signals similar to those of FIG. 5 to the low-frequency cutoff filter and conducting a velocity analysis similar to that of FIG. 5 is shown by the broken line in FIG. 7. Because of the sharpness of the low-frequency cutoff characteristic, the clutter signal is completely suppressed. The sharp low-frequency cutoff characteristic peculiar to a polynomial regression filter can be understood as follows.

A strictly Legendre polynomial is described in, for example, the book "Iwanami Formulae III" (special function, pp 82 to 85). When the polynomial is generalized, a Legendre's polynomial of an even-numbered degree (2n) can be defined as an even function of the highest degree 2n which is orthogonal to all of Legendre polynomials of the degrees lower than 2n, and a Legendre polynomial of the odd-numbered degree (2n+1) can be defined as an odd function of the highest degree 2n+1 which is orthogonal to all of Legendre's polynomials of the degrees lower than 2n+1. As an example, discrete Legendre functions from the 0th degree to the 7th degree are calculated on a series of time-series signals at eight points. The even-numbered degrees are shown in FIG. 8, and the odd-numbered degrees are shown in FIG. 9. The 0th degree and the 1st degree are shown by solid lines, the 2nd degree and 3rd degree are shown by broken lines, the 4th degree and the 5th degree are shown by alternate long and short dash lines, and the 6th degree and the 7th degree are shown by dot lines. The amplitude is normalized so that the RMS (root mean square) value becomes 1. The signs are determined so that the sign of the lowest degree becomes positive, that is, the sign of the constant term with respect to a polynomial of an even-numbered degree and the sign of the 1st-degree term with respect to a polynomial of an odd-numbered degree become positive.

FIG. 10 is a plot of the frequency spectra. The absolute value of the amplitude of a frequency component is normalized by the maximum value of each Legendre's expansion coefficient. In FIG. 10, eight functions are overlapped. FIG. 11 shows four functions out of the eight functions and FIG. 12 shows the other four functions by distinctive lines. In the diagrams, the Legendre expansion coefficients A(0) and A(7) of the 0th and 7th degrees are shown by solid lines, the Legendre expansion coefficients A(1) and A(6) of the 1st and 6th degrees are shown by broken lines, the Legendre expansion coefficients A(2) and A(5) of the 2nd and 5th degrees are shown by alternate long and short dash lines, and the Legendre expansion coefficients A(3) and A(4) of the 3rd and 4th degrees are indicated by dot lines.

Like FIGS. 2 to 4, FIGS. 10 to 12 show frequency responses to input complex sine waves. The peaks are regarded as main responses, and the others are regarded as sub responses. The sub response on the high frequency side of the Legendre function is larger than the main response as compared with the Fourier expansion systems of FIGS. 2 to 4. There is no sub response on the low frequency side. The higher the degree is, the faster the function is converged to zero around the frequency origin. Although analytical proof is omitted here, in the Legendre function of the m-th degree as a function of frequency, all of the 0th to the (m−1)th derivatives become zero at the frequency origin.

The polynomial regression filter can be said as a filter which expands an input signal with the discrete Legendre function as a basis function and outputs the sum of components of the (M+1)th or higher degrees as an output signal except for the 0th to Mth components. Therefore, an output signal converges to zero by a behavior proportional to the (M+1)th power of the frequency around the frequency origin. As shown in the examples indicated by the broken lines in FIGS. 6 and 7, the low-frequency cutoff characteristic of the polynomial regression filter is excellent due to the substantial characteristic of the Legendre function. Thus, it reaches the conclusion that the method using the polynomial regression filter and the Legendre function expansion is substantially suitable to detection of a target moving object while suppressing the influence of a hindrance component called clutter having an incomparably large amplitude around the frequency origin and Doppler velocity detection requiring an analysis of the velocity of a moving object.

It is widely known that, in the Fourier expansion system, by using a complex sine wave as a base, a signed velocity analysis can be conducted as shown in FIGS. 2 to 5 and FIG. 7, and such an analysis method is widely used. Although the Legendre expansion system has the nature extremely adapted to the Doppler velocity detection as described above, if the Legendre expansion system is used as it is, it responds equally to velocities having the equal absolute value but different signs as shown in FIGS. 10 to 12, and a signed velocity analysis cannot be performed.

In the invention, a complex Legendre function is generated by linearly connecting Legendre functions of an even-numbered degree and an odd-numbered degree which are different from each other only by one degree while using an imaginary unit "j" as a coefficient, thereby enabling a signed velocity analysis to be performed. Attention is paid to the phenomenon that the Legendre function of an even-numbered degree shows a change like a cosine wave, and the Legendre function of an odd-numbered degree shows a change like a sine wave. By linearly connecting the cosine and sine functions using the imaginary unit "j" as a coefficient, an exponential function of "j" times of the phase angle, that is, a complex sine function is obtained. A signed velocity is obtained according to increase/decrease of the phase angle. Similarly, a signed velocity is obtained from the complex Legendre function. Concretely, first, a series of time-series signals at N points are expanded using discrete Legendre functions of the 0th degree to the (N−1)th degree as basic functions, and expansion coefficients A(0) to A(N−1) are obtained. On the basis of the expansion coefficients, a series of complex Legendre expansion coefficients are calculated as shown by the following equations.

$$C(\pm(2n-1))=A(2n-2)\pm jA(2n-1)\ (1\leq 2n-1\leq N-1)$$
$$C(\pm 2n)=A(2n)\pm jA(2n-1)\ (2\leq 2n\leq N-1; n: \text{natural number. Double sign convention}) \quad (4)$$

According to the relative magnitudes of the coefficients, a signed velocity analysis is conducted.

In FIG. 13, with respect to the case where N=8 in a manner similar to FIGS. 10 to 12, absolute values of complex Legendre expansion coefficients as outputs to a complex sine wave input are shown as functions of phase rotation velocities corresponding to signed velocities. The absolute values of the complex Legendre coefficients are normalized with the maximum values and the resultants are plotted. In FIG. 13, 14 functions are shown so as to be overlapped. The functions are shown in FIGS. 14 to 17 by distinctive lines. The complex Legendre expansion coefficients C(1), C(3), C(5), and C(7) are shown by solid lines, the complex Legendre expansion coefficients C(2), C(4), and C(6) are shown by broken lines, the complex Legendre expansion coefficients C(−2), C(−4), and C(−6) are shown by alternate long and short dash lines, and the complex Legendre expansion coefficients C(−1), C(−3), C(−5), and C(−7) are shown by dot lines. It is understood that the (2N−2) complex Legendre expansion coefficients respond to the signs (positive and negative signs) of the velocity. It is confirmed that a complex Legendre system having such responses can be configured in the range of N≦35.

In FIG. 18, the phase angle determined by the ratio of absolute values of even-numbered degree and odd-numbered degree Legendre coefficients constructing the 2N−2 complex Legendre expansion coefficients is shown as a function of a phase rotation velocity corresponding to a signed velocity. The diagram shows, in order from the inner side, even-numbered and odd-numbered phase angles of C(±1), C(±2), C(±3), C(±4), C(±5), C(±6), and C(±7). Since the even-numbered and odd-numbered phase angles of each complex Legendre expansion coefficient change monotonously as a velocity function. By using it, even if a relatively small number of complex Legendre expansion coefficients are used, velocity detection/analysis on continuous functions can be performed.

When a clutter signal having an amplitude incomparably larger than that of an echo of a moving reflector to be detected/analyzed exists and drifts, it is sufficient to perform a velocity detection/analysis using a complex Legendre expansion coefficient system obtained by sequentially eliminating coefficients of low degrees like C(±1), C(±2), . . . as the degree of drifting increases. By controlling the cutoff degree of the Legendre expansion coefficient, the velocity of a moving reflector can be detected and analyzed while suppressing the influence of a clutter signal.

Representative configuration examples of the present invention will be described hereinbelow.

(1) The present invention provides a Doppler velocity detection device for transmitting/receiving pulse waves to/from an object whose velocity is to be measured a plurality of times and, on the basis of received echo signals, analyzing the velocity of the object whose velocity is to be measured, wherein reception echo time-series signals obtained by arranging reception echo signals of equal lapse time from transmission times of pulses in order of the transmission times are expanded as components of a Legendre polynomial, and a velocity signal of the object whose velocity is to be measured is obtained on the basis of the magnitudes of expansion coefficients.

(2) In the Doppler velocity detection device of (1), an expansion coefficient of an even-numbered degree term and an expansion coefficient of an odd-numbered degree term which is different from the even-numbered degree term by one degree, derived when the reception echo time-series signals are expanded as components of a Legendre polynomial starting from the 0th degree, are linearly connected by using an imaginary unit as a coefficient, thereby obtaining a complex expansion coefficient and, on the basis of the ratio between the magnitude of each complex expansion coefficient and the magnitude of an interval between the complex expansion coefficients, a signed velocity signal is derived.

(3) The present invention also provides a Doppler velocity detection device including: means for transmitting/receiving pulse waves to/from a subject a plurality of times; and velocity analyzing means for analyzing a velocity of a moving reflector in the subject on the basis of a reception echo signal, wherein the velocity analyzing means obtains a complex expansion coefficient by linearly connecting an expansion coefficient of an even-numbered degree term and an expansion coefficient of an odd-numbered degree term which is different from the even-numbered degree term by one degree, derived when reception echo time-series signals obtained by arranging reception echo signals of equal lapse time from pulse transmission times in order of the transmission times are expanded as components of a Legendre polynomial starting from the 0th degree, by using an imaginary unit as a coefficient, and obtains a signed velocity signal of a moving reflector in the subject on the basis of the ratio between the magnitude of each complex expansion coefficient and the magnitude of an interval between the complex expansion coefficients.

(4) The Doppler velocity detection device of (3) may further include display means for two-dimensionally or three-dimensionally displaying a velocity signal of the moving reflector together with an echo signal from a stationary reflector in the subject.

(5) The present invention also provides an ultrasonographic device including: an ultrasonic probe; means for allowing the ultrasonic probe to transmit/receive ultrasonic pulse waves to/from a subject a plurality of times; and velocity analyzing means for analyzing velocity of a moving reflector in the subject on the basis of reception echo signals from the subject, wherein the velocity analyzing means expands reception echo time-series signals obtained by arranging reception echo signals of equal lapse time from transmission times of the ultrasonic pulses in order of the transmission times as components of a Legendre polynomial, and obtains a velocity signal of a moving reflector in the subject on the basis of the-magnitude of each of the expansion coefficients.

(6) In the ultrasonographic device of (5), the velocity analyzing means obtains a complex expansion coefficient by linearly connecting an expansion coefficient of an even-numbered degree term and an expansion coefficient of an odd-numbered degree term which is different from the even-numbered degree term by one degree, derived when the reception echo time-series signals are expanded as components of a Legendre polynomial starting from the 0th degree, by using an imaginary unit as a coefficient, and obtains a signed velocity signal on the basis of the ratio between the magnitude of each complex expansion coefficient and the magnitude of an interval between the complex expansion coefficients.

(7) The present invention also provides an ultrasonographic device including: an ultrasonic probe; means for allowing the ultrasonic probe to transmit/receive ultrasonic pulse waves to/from a subject a plurality of times; and means for analyzing velocity of a blood flow in a moving organ in the subject on the basis of reception echo signals from the subject, wherein the velocity analyzing means obtains a complex expansion coefficient by linearly connecting an expansion coefficient of an even-numbered degree term and an expansion coefficient of an odd-numbered degree term which is different from the even-numbered degree term by one degree, derived when the reception echo time-series signals obtained by arranging reception echo signals of equal lapse time from transmission times of the ultrasonic pulses in order of the transmission times are expanded as components of a Legendre polynomial starting from the 0th degree, by using an imaginary unit as a coefficient, and obtains a signed velocity signal of the blood flow in the subject on the basis of the ratio between the magnitude of each complex expansion coefficient and the magnitude of an interval between the complex expansion coefficients.

(8) The ultrasonographic device of (7) may further include display means for displaying a distribution image of a motion velocity of the organ or a spatial change in the motion velocity and a blood flow distribution image obtained simultaneously so as to be superimposed or arranged side by side.

(9) An ultrasonographic device of the present invention includes: ultrasonic wave transmitting/receiving means for allowing a plurality of ultrasonic probes to transmit/receive an ultrasonic pulse to/from a subject a plurality of times; a transmission beam former for controlling a transmission focal position of an ultrasonic pulse in the subject; a reception beam former for controlling a reception focal position in the subject; a controller for controlling the ultrasonic wave transmitting/receiving means, the transmission beam former, and the reception beam former; and velocity analyzing means for analyzing velocity of a moving reflector in the subject on the basis of reception echo signals from the subject, wherein the velocity analyzing means obtains a complex expansion coefficient by linearly connecting an expansion coefficient of an even-numbered degree term and an expansion coefficient of an odd-numbered degree term which is different from the even-numbered degree term by one degree, derived when reception echo time-series signals obtained by arranging reception echo signals of equal lapse time from transmission times of the ultrasonic pulses in order of the transmission time are expanded as components of a Legendre polynomial starting from the 0th degree, by using an imaginary unit as a coefficient, and obtains a signed velocity signal of a moving reflector in the subject on the basis of the ratio between the magnitude of each complex expansion coefficient and the magnitude of an interval between the complex expansion coefficients.

BEST MODE FOR CURRYING OUT THE INVENTION

Embodiments of the present invention will be described in detail hereinbelow with reference to the drawings.

Figure 19:
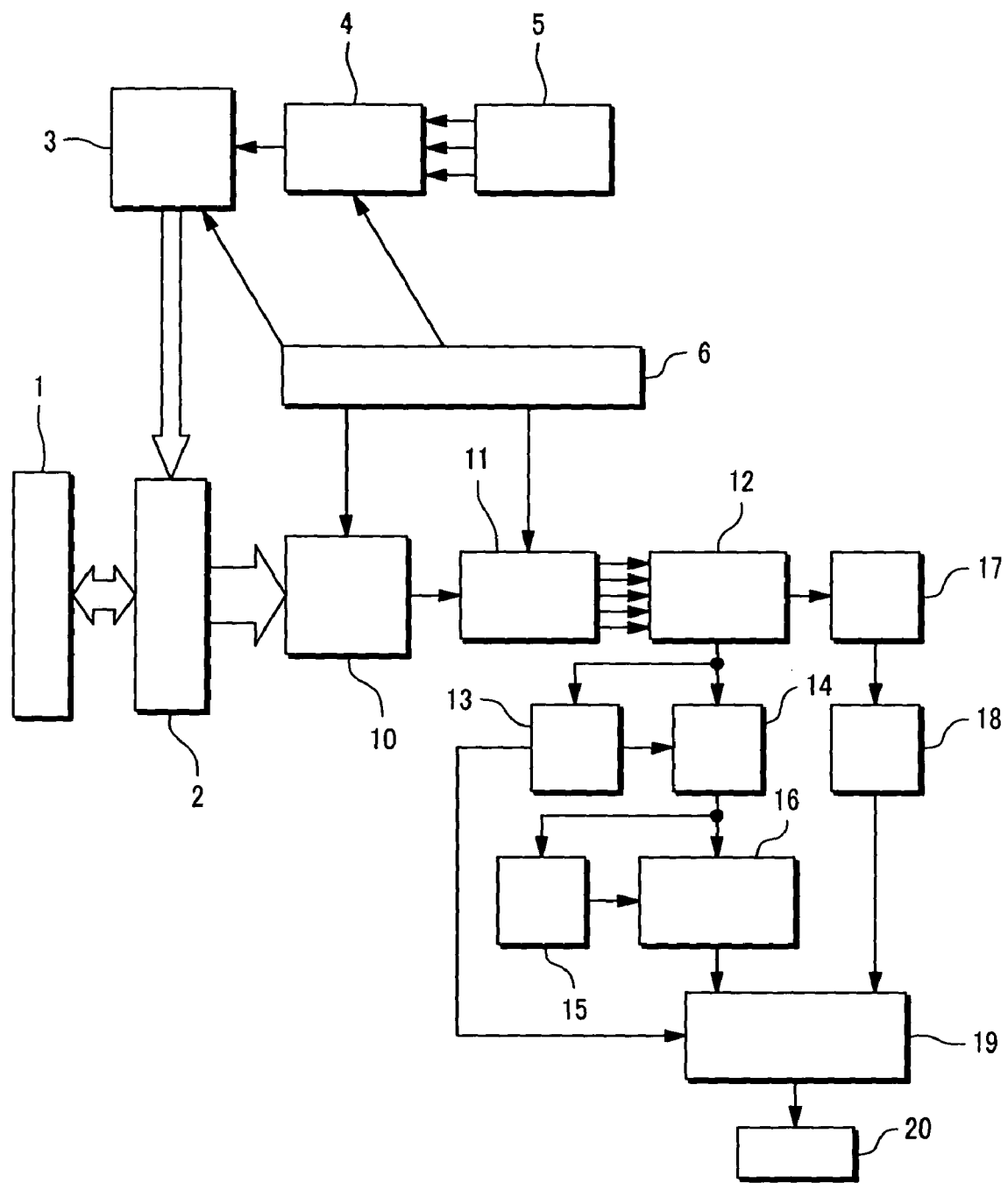
FIG. 19 is a block diagram showing the configuration of an ultrasonographic device with a blood flow detecting/drawing function as an embodiment of the invention.

FIG. 19 is a block diagram showing a typical example of an ultrasonographic device with a blood flow drawing function constructed to carry out the present invention. Elements constructing an ultrasonic probe 1 are connected to a transmission beam former 3 and a reception beam former 10 via a change-over switch group 2. The transmission beam former 3 generates a signal which becomes an ultrasonic pulse having directivity when transmitted via the elements by using a waveform selected by a transmission waveform selector 4 and read from a transmission waveform memory 5 under control of a transmission/reception sequence controller 6. The signal is converted to an ultrasonic pulse by each of the elements of the ultrasonic probe 1 and the ultrasonic pulse is transmitted to a living body. An ultrasonic echo signal reflected or scattered in the living body and returned to the ultrasonic probe 1 is received by the elements and converted to an electric signal. The reception beam former 10 gives delay time to each of reception signals and adds the resultant signals in order to generate reception sensitivity having directivity under control of the transmission/reception sequence controller 6. Time-series signals obtained by the addition of delay are temporarily written into one of banks in a reception signal memory 12 selected by a reception memory selector 11 under control of the transmission/reception sequence controller 6. After N pieces of time-series signals to be subjected to a Doppler signal analysis are stored, the signals are read and subjected to signal processes to detect and analyze velocity in the blocks 13 to 16.

The portions of read N time-series reception signals, having equal time phase in reference to the times of pulse transmission performed to obtain the reception signals as a reference in the read N time-series signals are arranged in order of transmission time and, after that, the arranged signals are processed. First, a phase rotation detector 13 detects a phase rotation from the time-series signals including clutter signals. The most typical method of detecting a phase rotation amount Pn is performed by calculating the following equation on the basis of complex time-series signals $S(n)$ arranged as $n=1, \ldots, N$, $$P(n)=S(n+1)S(n)^*/\|S(n+1)\|/\|S(n)\| \quad (n=1, \ldots, N-1) \quad (5)$$

and obtaining an average phase rotation velocity from the phase of an average value Pa of P(n). In the equation, S* denotes a complex conjugate of S, and $\|S\|$ denotes the absolute value of S. Generally, a clutter echo signal has a signal amplitude incomparably larger than that of a blood flow echo signal, so that Pa can be regarded as a phase rotation average value of the clutter echo signals. A down mixer 14 performs a mixing process so that the phase rotation average value of the echo signal becomes zero, in other words, the center frequency of the clutter signal becomes almost zero by using the calculated average value Pa or a space average value in the peripheral region of Pa. That is, the following equation is obtained by S(n) and Pa.

$$Sd(n)=S(n)Pa^{*n} \ (n=1,\ldots,N) \tag{6}$$

where Pa* denotes a complex conjugate of Pa.

By performing the down mixing process, the following processes for suppressing a clutter signal can be performed more efficiently. On the basis of the obtained complex time-series signals Sd(n), a phase rotation detector 15 calculates, like the phase rotation detector 13, the phase rotation amount Pd(n) after the down mixing process by the following equation to thereby obtain the maximum value of the absolute value of the phase.

$$Pd(n)=Sd(n+1)Sd(n)^*/\|Sd(n+1)\|/\|Sd(n)\| (n=1,\ldots, N-1) \tag{7}$$

According to the magnitude of the phase rotation maximum value, a cutoff characteristic of a blood flow signal detector/analyzer 16 is controlled. Specifically, when the phase rotation maximum value is large, a control is performed to set the cutoff degree M of the Legendre coefficient to be higher than that in the case where the phase rotation maximum value is small, a clutter component is effectively suppressed.

Figure 8:
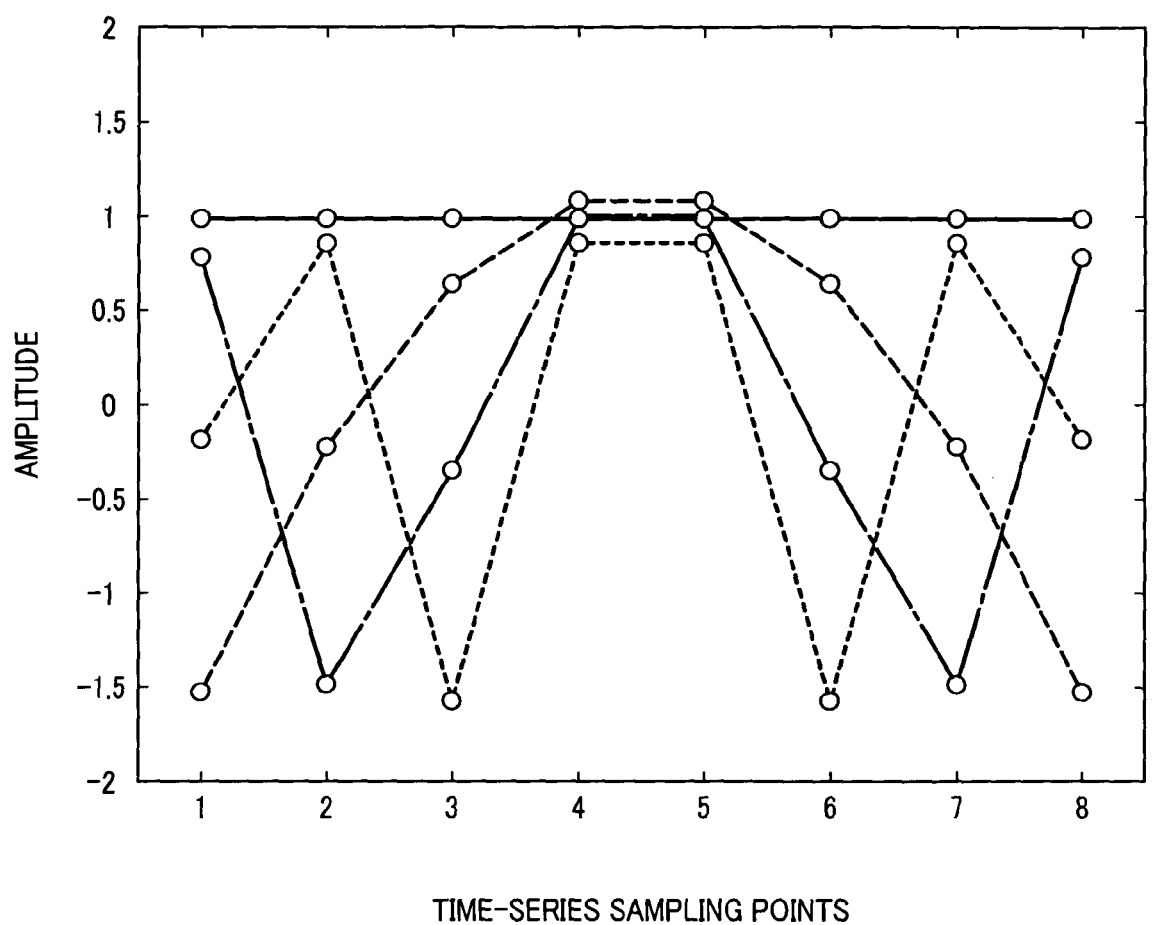
FIG. 8 is a diagram showing even-numbered degrees of discrete Legendre functions of a series of signals in eight points.
Figure 9:
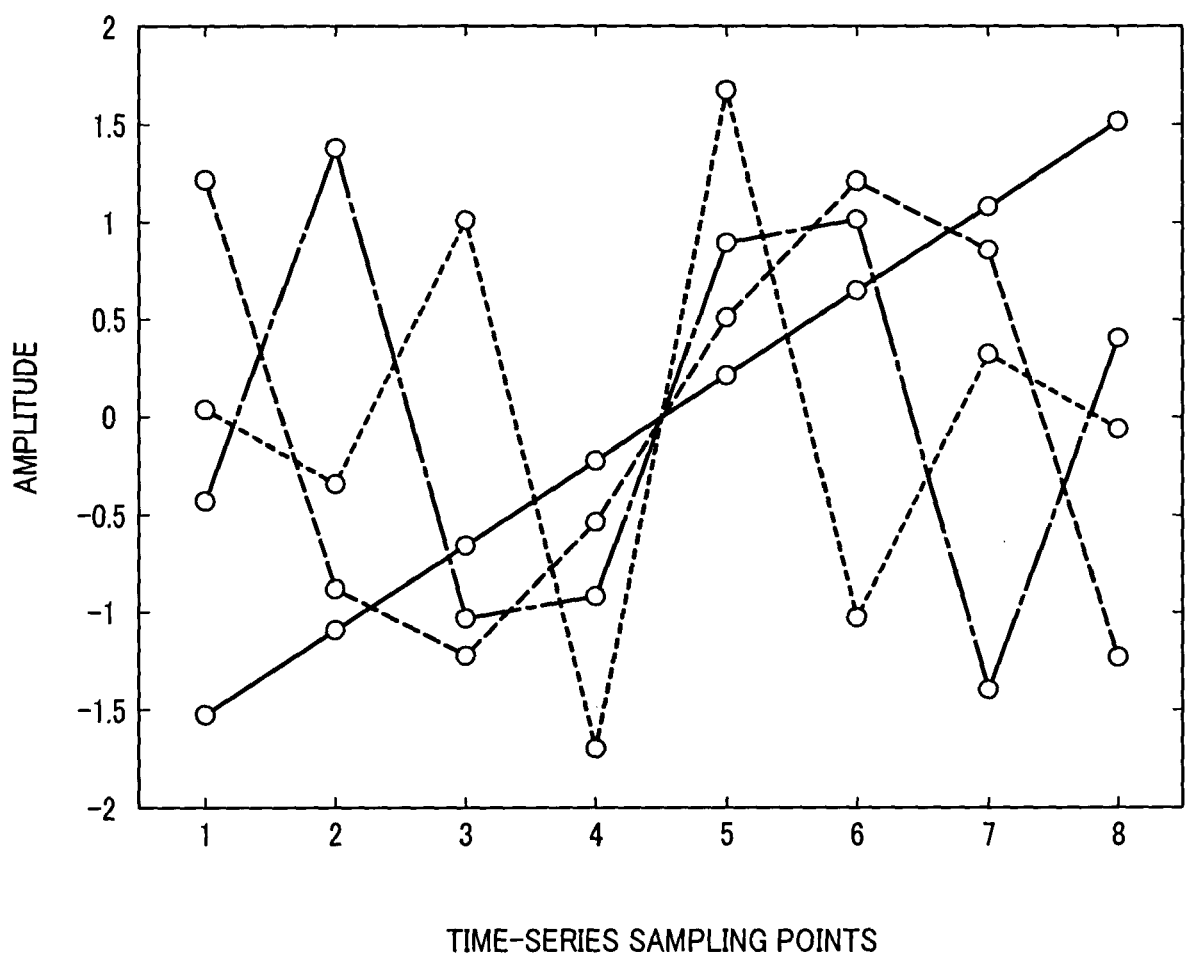
FIG. 9 is a diagram showing odd-numbered degrees of discrete Legendre functions of a series of signals in eight points.
Figure 10:
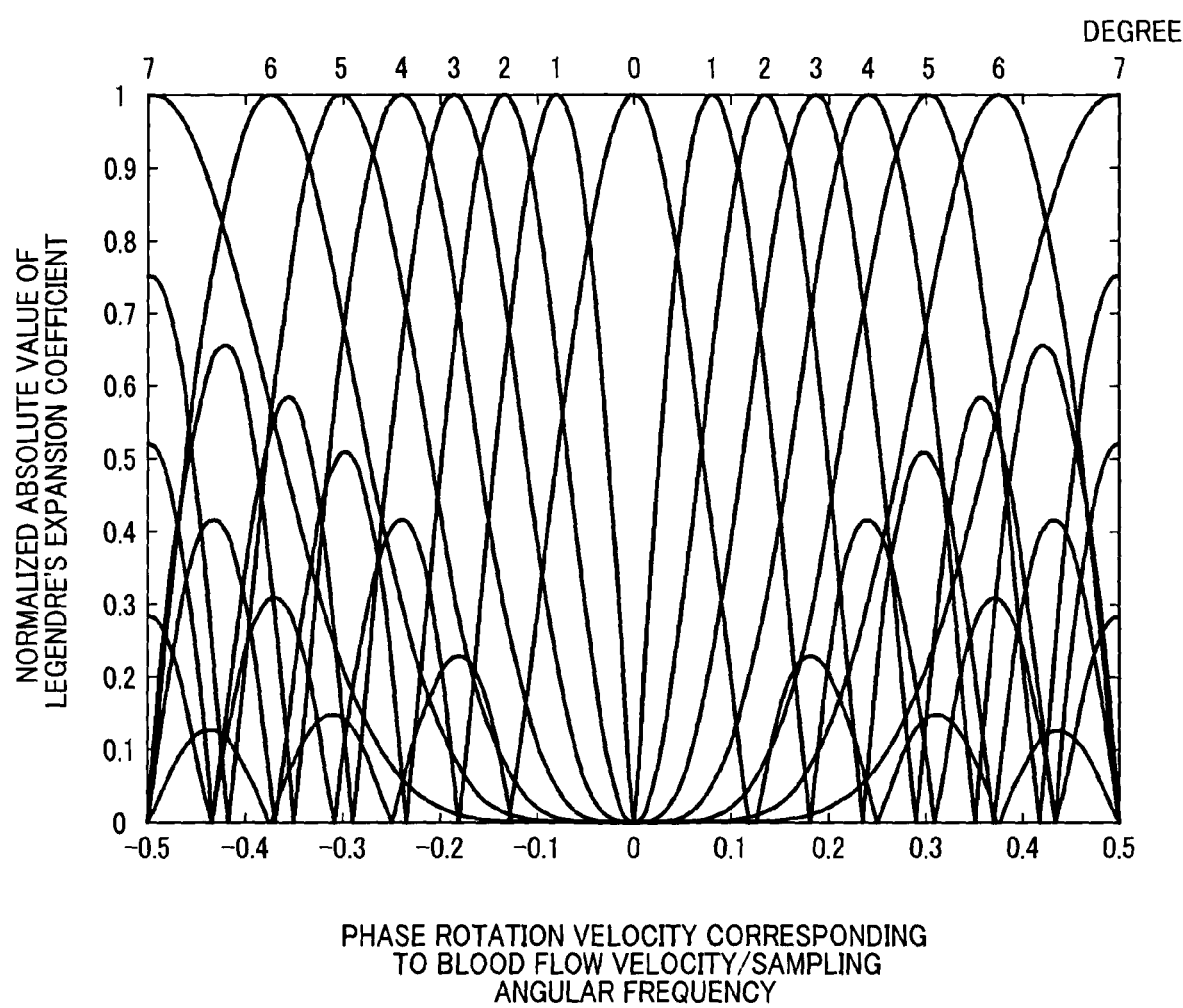
FIG. 10 is a diagram showing normalized absolute values of the Legendre expansion coefficients as signed frequency functions corresponding to velocities.
Figure 11:
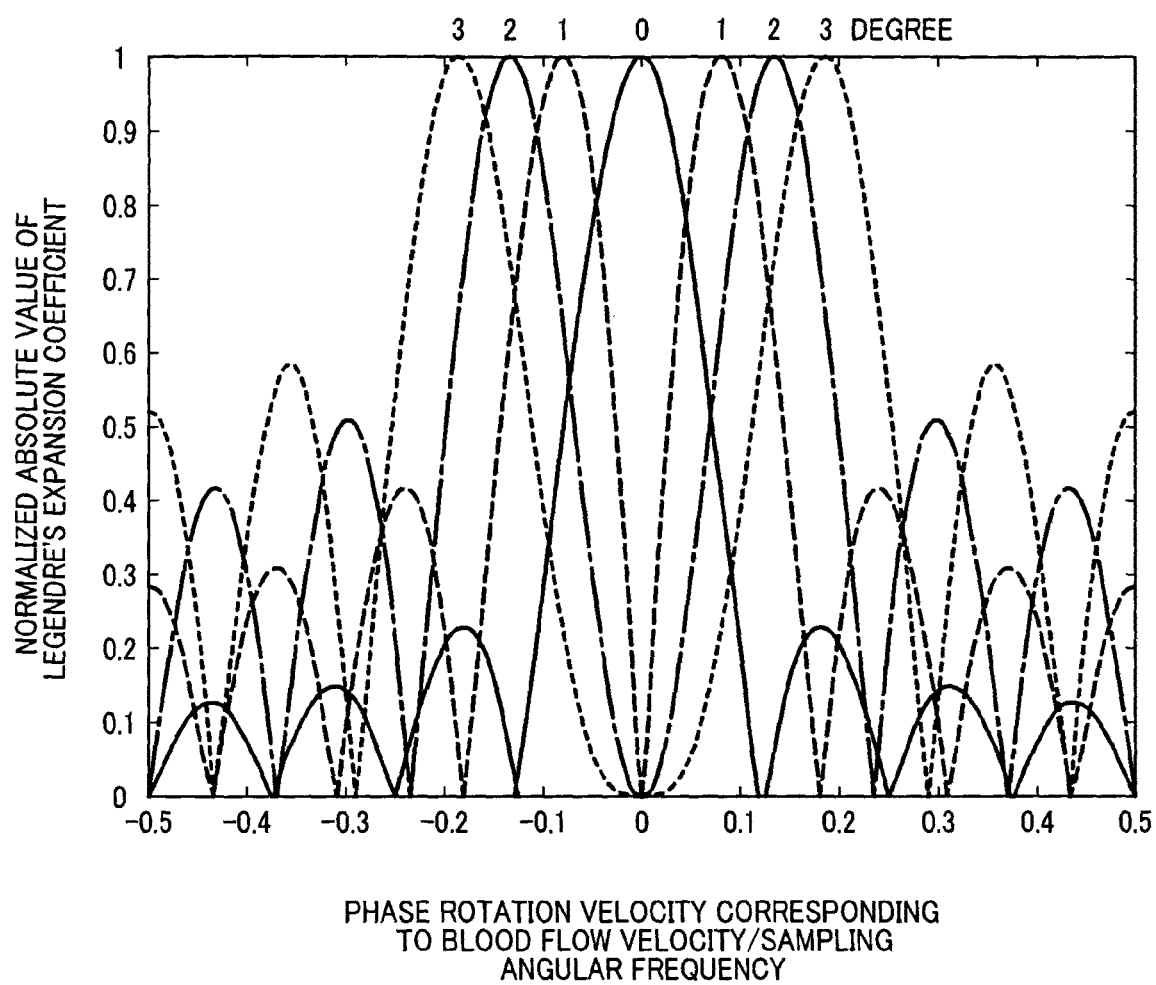
FIG. 11 is a diagram showing normalized absolute values of the four Legendre expansion functions in FIG. 10 as signed frequency functions corresponding to velocities.
Figure 12:
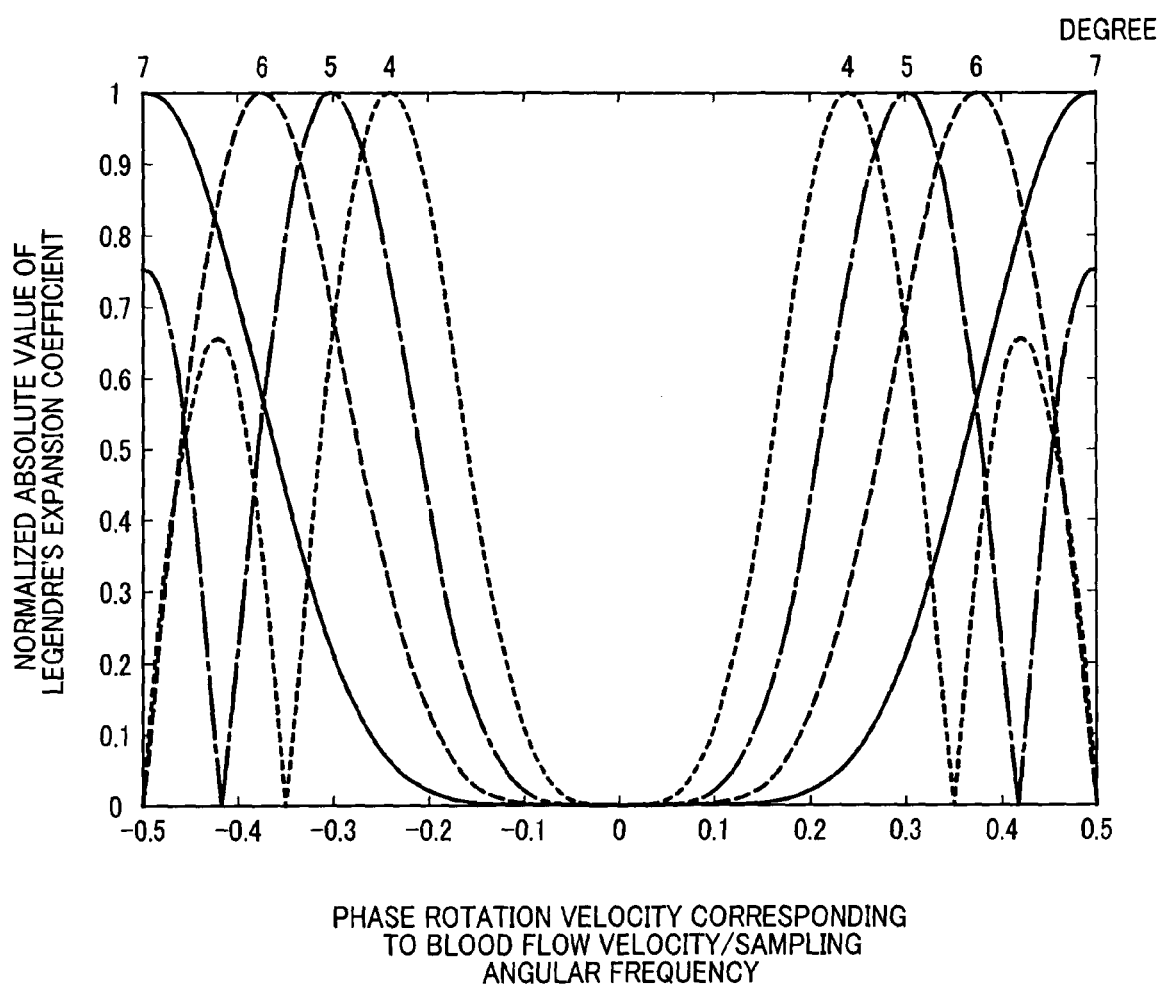
FIG. 12 is a diagram showing normalized absolute values of the other four Legendre expansion coefficients in FIG. 10 as signed frequency functions corresponding to velocities.
Figure 13:
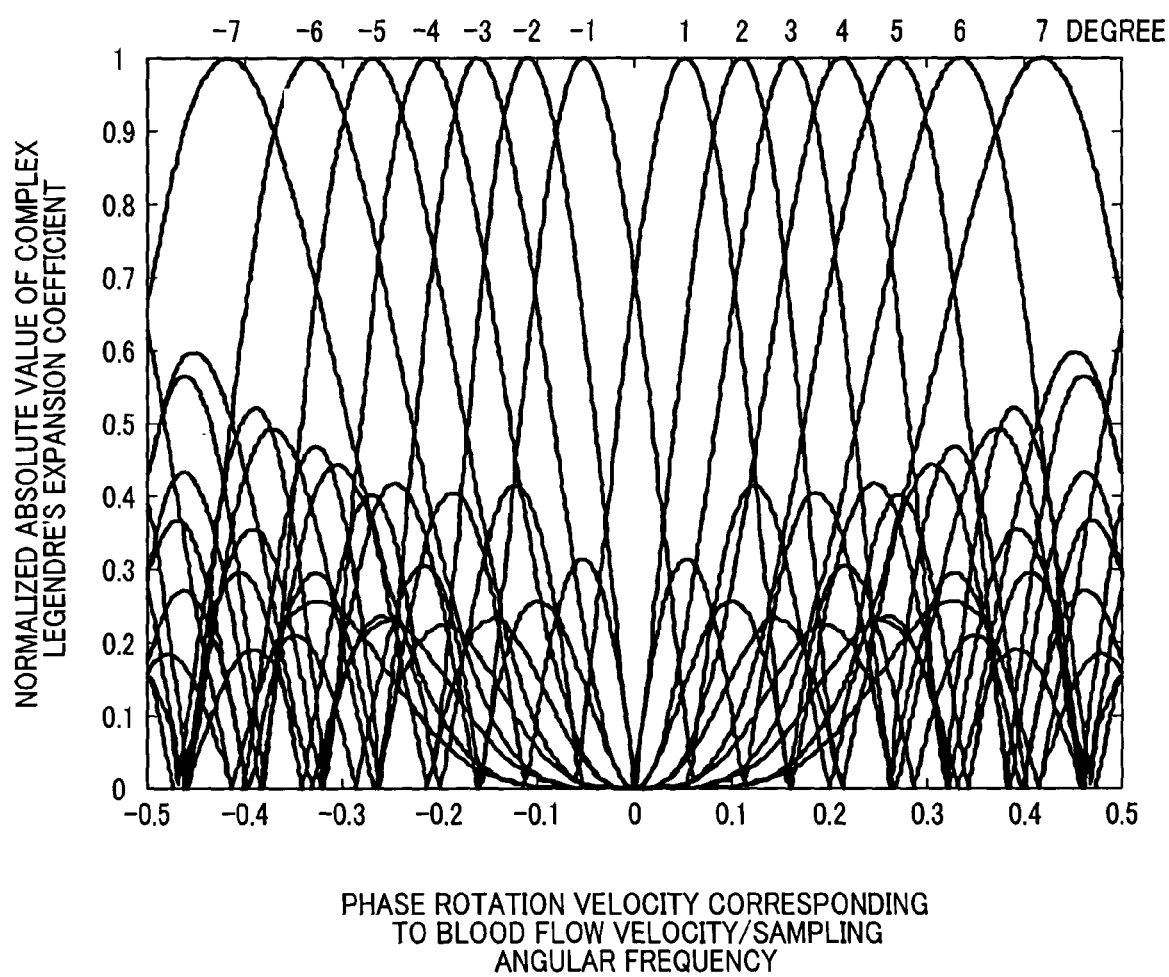
FIG. 13 is a diagram showing normalized absolute values of complex Legendre expansion coefficients as signed frequency functions corresponding to velocities.
Figure 14:
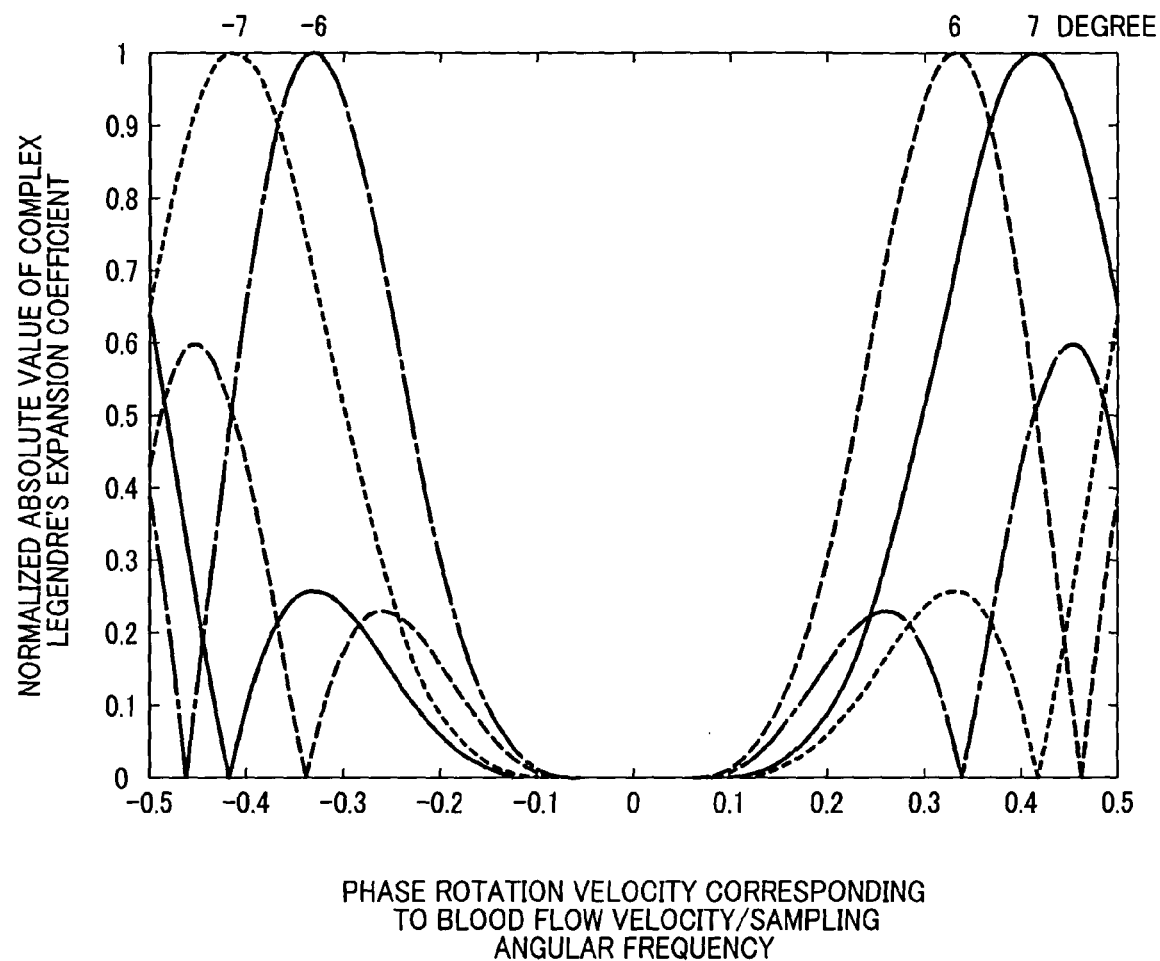
FIG. 14 is a diagram showing normalized absolute values of complex Legendre expansion coefficients of the ±6th degree and the ±7th degree in FIG. 13 as signed frequency functions corresponding to velocities.
Figure 15:
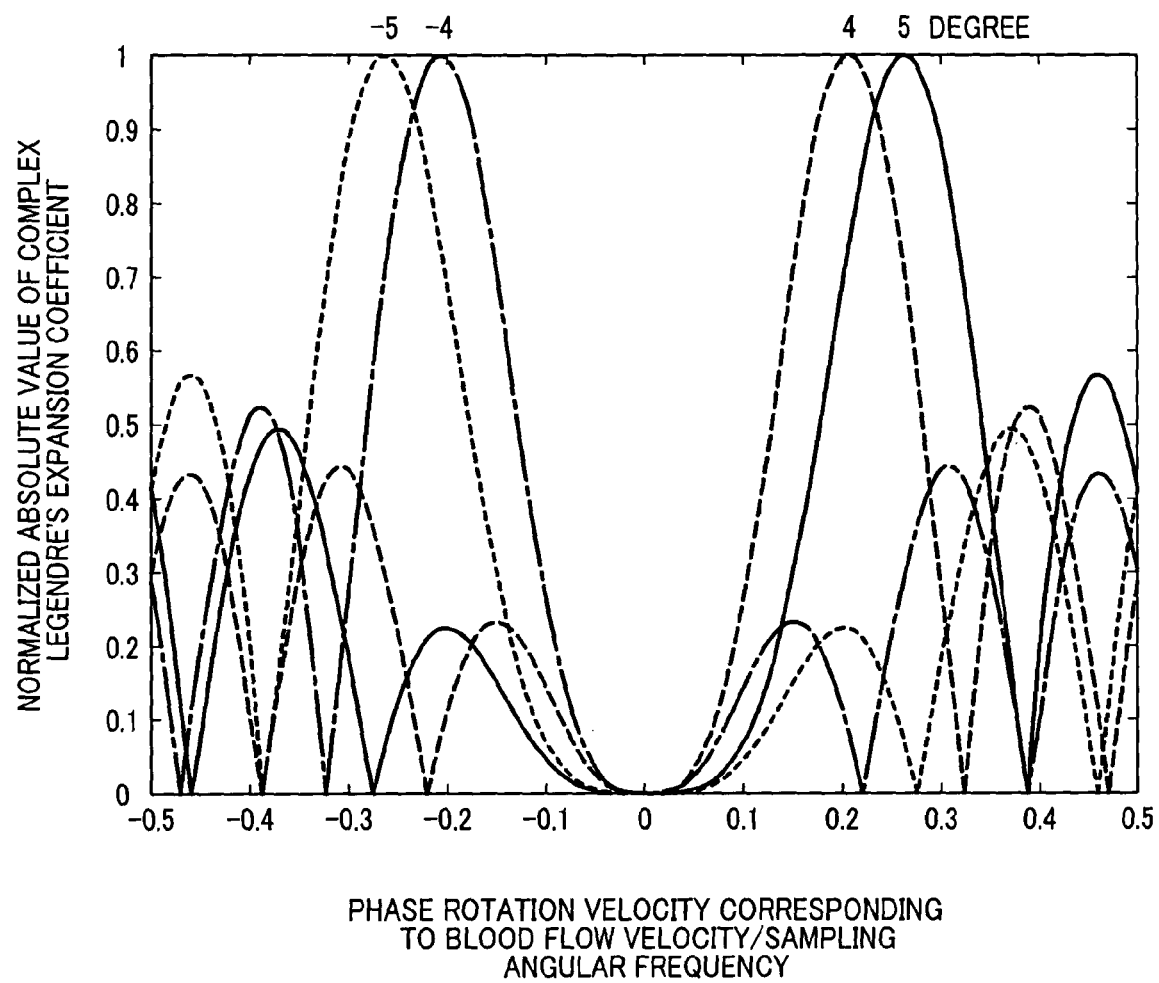
FIG. 15 is a diagram showing normalized absolute values of complex Legendre expansion coefficients of the ±4th degree and the ±5th degree in FIG. 13 as signed frequency functions corresponding to velocities.
Figure 16:
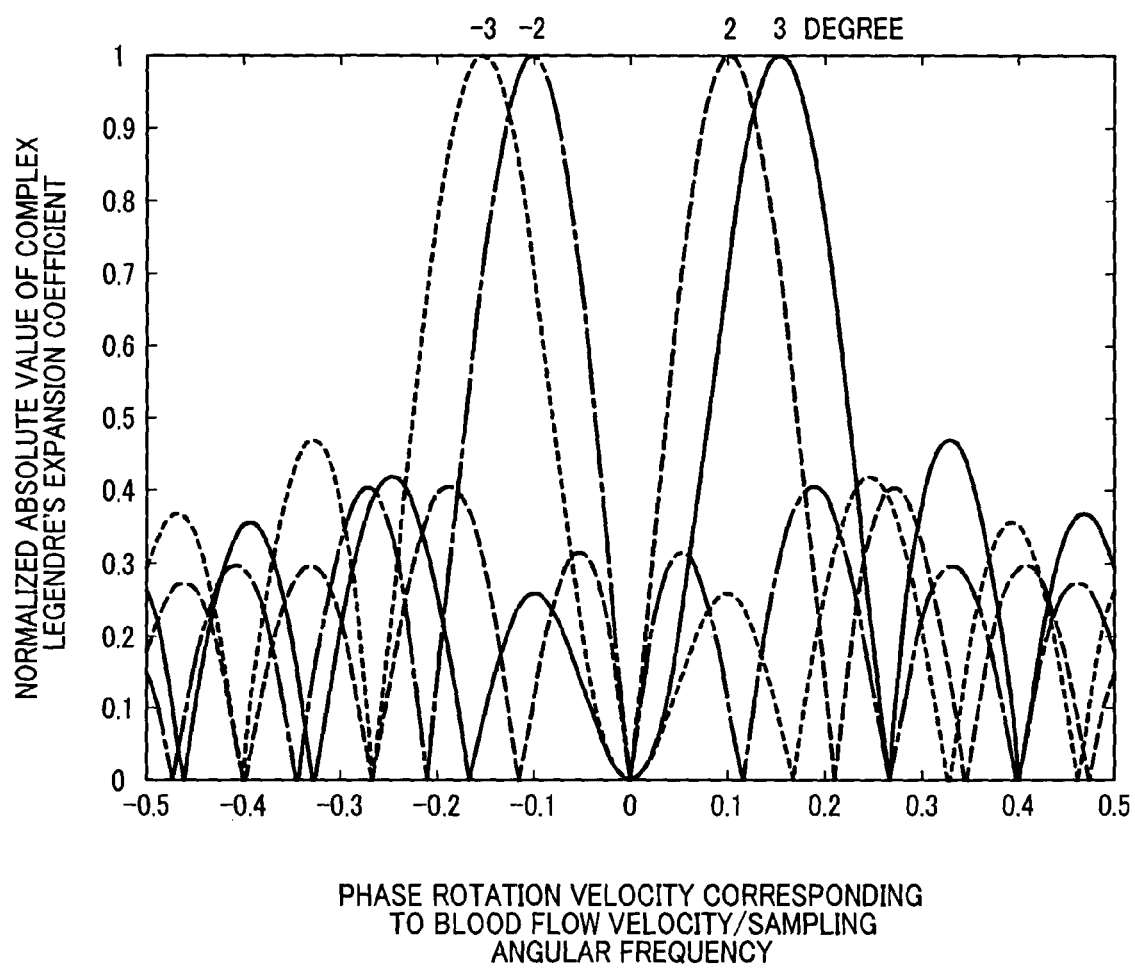
FIG. 16 is a diagram showing normalized absolute values of complex Legendre expansion coefficients of the ±2nd degree and the ±3rd degree in FIG. 13 as signed frequency functions corresponding to velocities.
Figure 17:
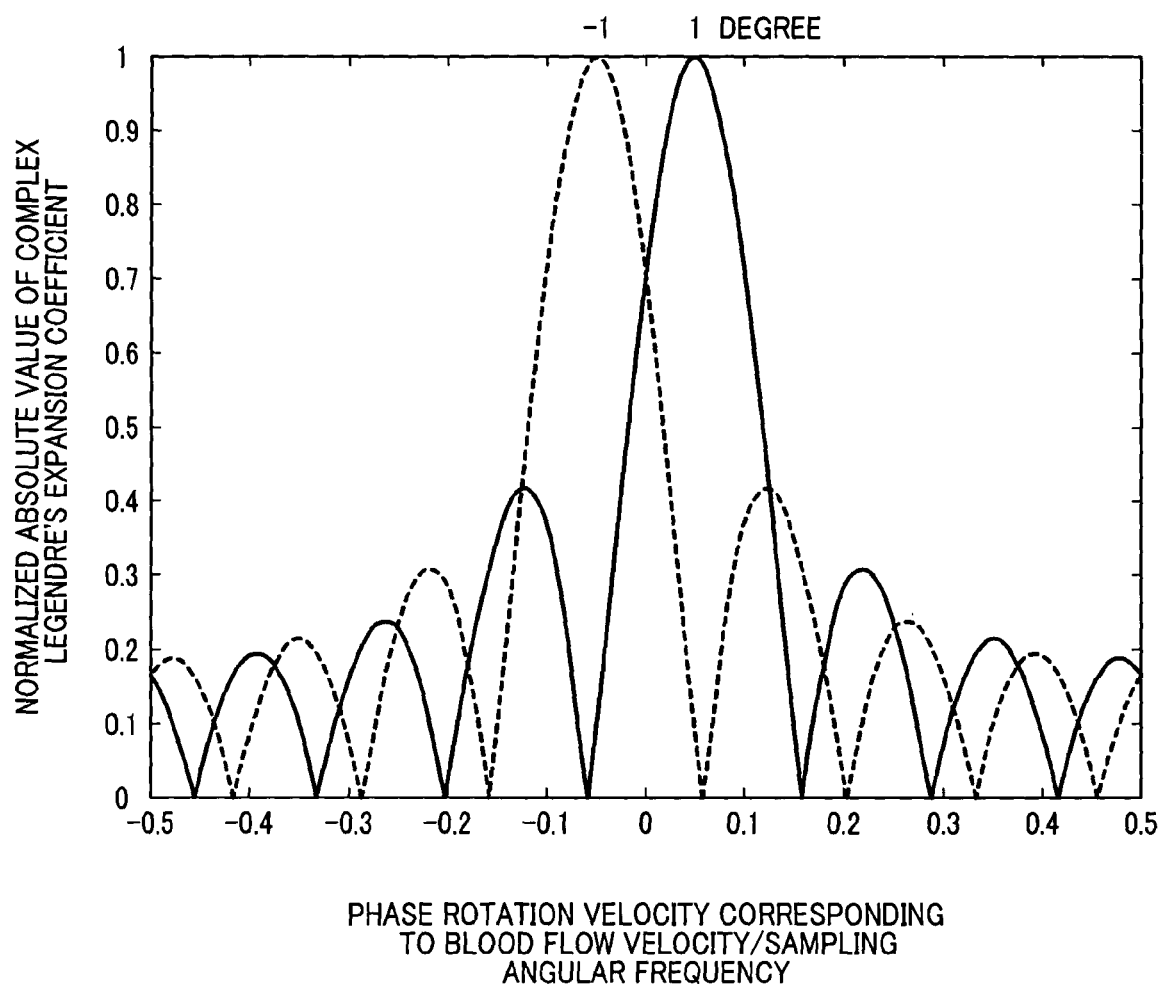
FIG. 17 is a diagram showing normalized absolute values of the complex Legendre expansion coefficient of the ±1st degree in FIG. 13 as a signed frequency function corresponding to velocities.

The operation of the blood flow signal detector/analyzer 16 corresponding to the core of the present invention will be elaborated. First, the input time-series signals Sd(1), . . . , and Sd (N) are expanded to Legendre functions of the 0th degree to the N−1th degree as shown in the examples of FIGS. 8 and 9, thereby obtaining expansion coefficients A(0), . . , and A(N−1) of the Legendre functions. The calculation can be performed more easily by a matrix computation as shown below. When the Legendre function of the L-th degree is expressed by a row vector L(n) and an N×N matrix LL is generated by arranging row vectors L(0) to L(N−1) (n=0 to N−1), a matrix for obtaining column vectors A having elements A(0) to A(N−1) from column vectors Sd having Sd(1) to Sd (N) as elements can be obtained as follows.

$$FF=(LL \cdot {}^tLL)^{-1}LL \tag{8}$$

where $^tLL$ denotes a transposed matrix and $LL^{-1}$ expresses an inverse matrix of LL. By preparing the matrix, a Legendre expansion coefficient can be obtained promptly by a matrix computation shown by the following equation.

$$A=FF \cdot Sd \tag{9}$$

From the expansion coefficients A(0), . . . , and A(N−1), complex Legendre expansion coefficients C(±1), . . . , and C(±(N−1)) are derived by the equation (4), the cutoff degree M is determined in accordance with the phase rotation maximum value, and the complex Legendre coefficients of low degrees of C (±1), . . . , and C(±(M+1)) are discarded. Next, the absolute value of each of the complex Legendre coefficients is obtained and calibrated and, after that, a complex Legendre expansion coefficient of the maximum coefficient is selected. As examples shown in FIGS. 13 to 17, a maximum value at the time of sweeping the frequency corresponding to the signed velocity is preliminarily obtained with respect to the complex Legendre coefficient absolute value as an output when a complex sine wave having a predetermined amplitude is input, and the absolute value of the coefficient is calibrated by using the maximum value. From the even and odd phase angles of the selected complex Legendre coefficient, a frequency corresponding to the blood flow velocity is computed. As shown in the example of FIG. 18, a phase rotation velocity corresponding to the signed velocity is swept with respect to the even and odd phase angles of the complex Legendre coefficient as an output when a complex sine wave having a predetermined amplitude is input, thereby obtaining velocity calibration curves in advance.

Figure 18:
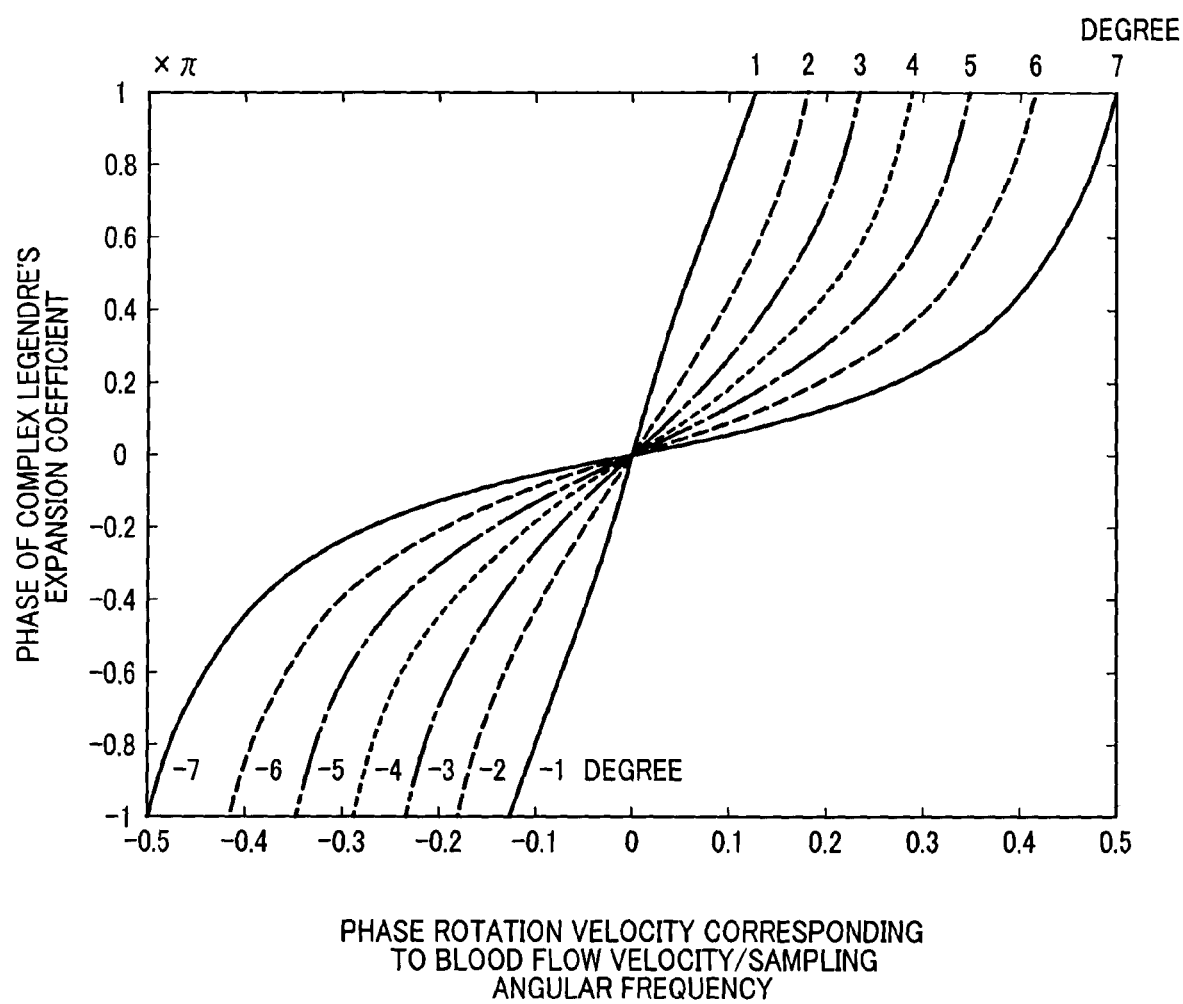
FIG. 18 is a diagram showing even and odd phase angles of the complex Legendre expansion coefficients as signed frequency functions corresponding to velocities.
Figure 20:
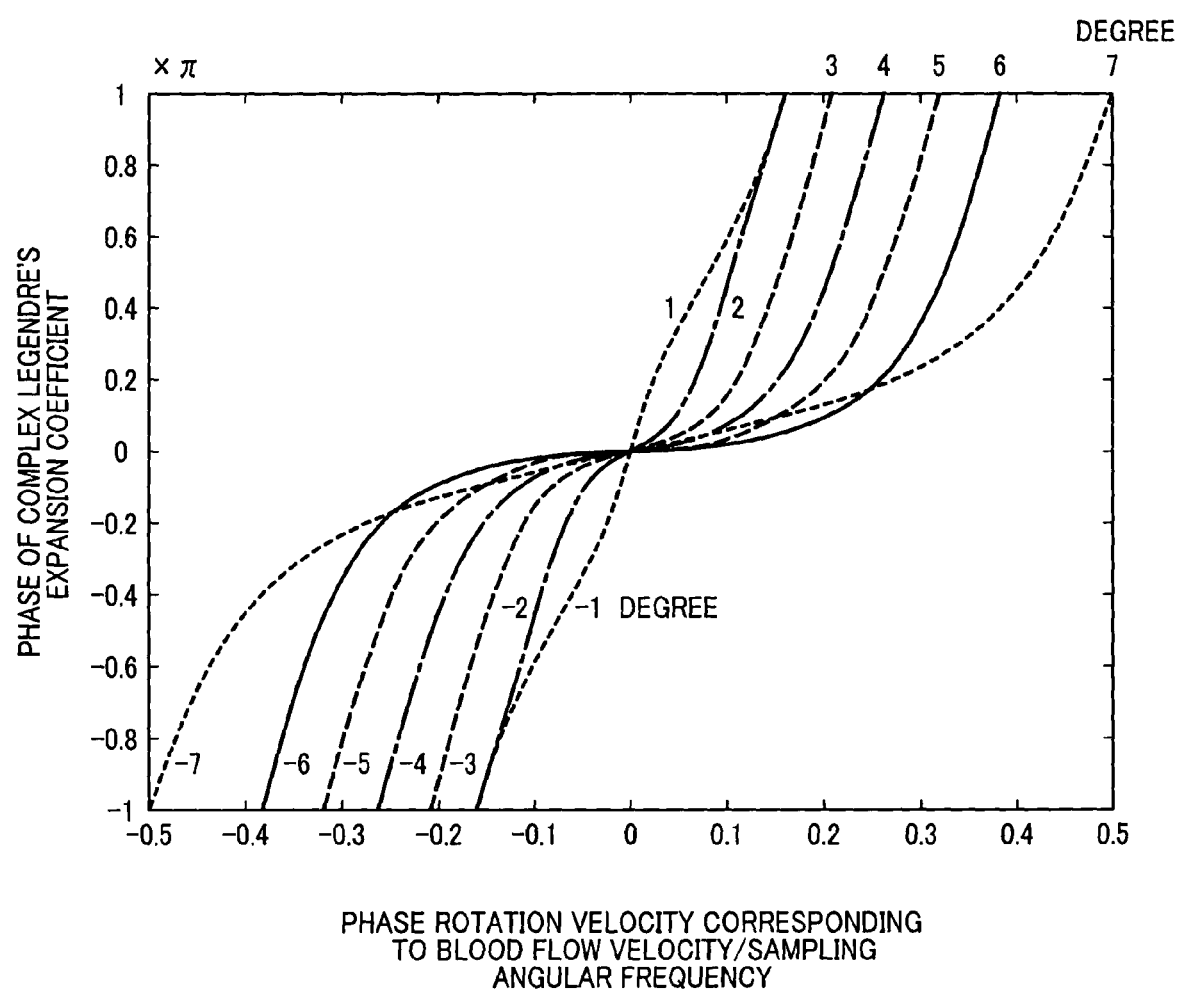
FIG. 20 is a diagram showing velocity calibration curves formed by using the ratio among a plurality of complex Legendre coefficient absolute values as signed frequency functions corresponding to velocities.

As a curve for velocity calibration, except for the even and odd phase angles of each of complex Legendre expansion coefficients as shown in FIG. 18, the ratio of a plurality of complex Legendre expansion coefficient absolute values can be also used. An example is shown in FIG. 20. In the example, when $\|C(n)\|$ is the maximum among the absolute values of the complex Legendre expansion coefficients, arc tangent functions of $\|C(n+1)/C(n-1)\|$ or $\|C(n-1)/C(n+1)\|$ are used as calibration curves. When $\|C(\pm 7)\|$ is the maximum, in a manner similar to FIG. 18, even and odd phase angles of C(±7) are used. When $\|C(\pm 1)\|$ is the maximum, an arc tangent function of $\|C(\pm 2)/C(\pm 1)\|$ (double-sign convention) is used.

The obtained blood flow signal is input to a scan converter 19 together with an echo signal from a stationary organ obtained by an echo amplitude detector 17 and an echo amplitude compressor 18. The scan converter 19 properly multiplexes a plurality of input signals to generate and control signals so as to display a two-dimensional or three-dimensional image on a display 20. When the complex Legendre expansion coefficients of the low degrees from C(±1) to C(±(M+1)) are discarded and a velocity analysis is performed with the complex Legendre expansion coefficients of C(±(M+2)) to C(±(N−1)), it is difficult to perform an accurate velocity analysis on a velocity whose absolute value is smaller than that of a velocity whose maximum is the Legendre coefficient A(M), so that a countermeasure is necessary.

Figure 1:
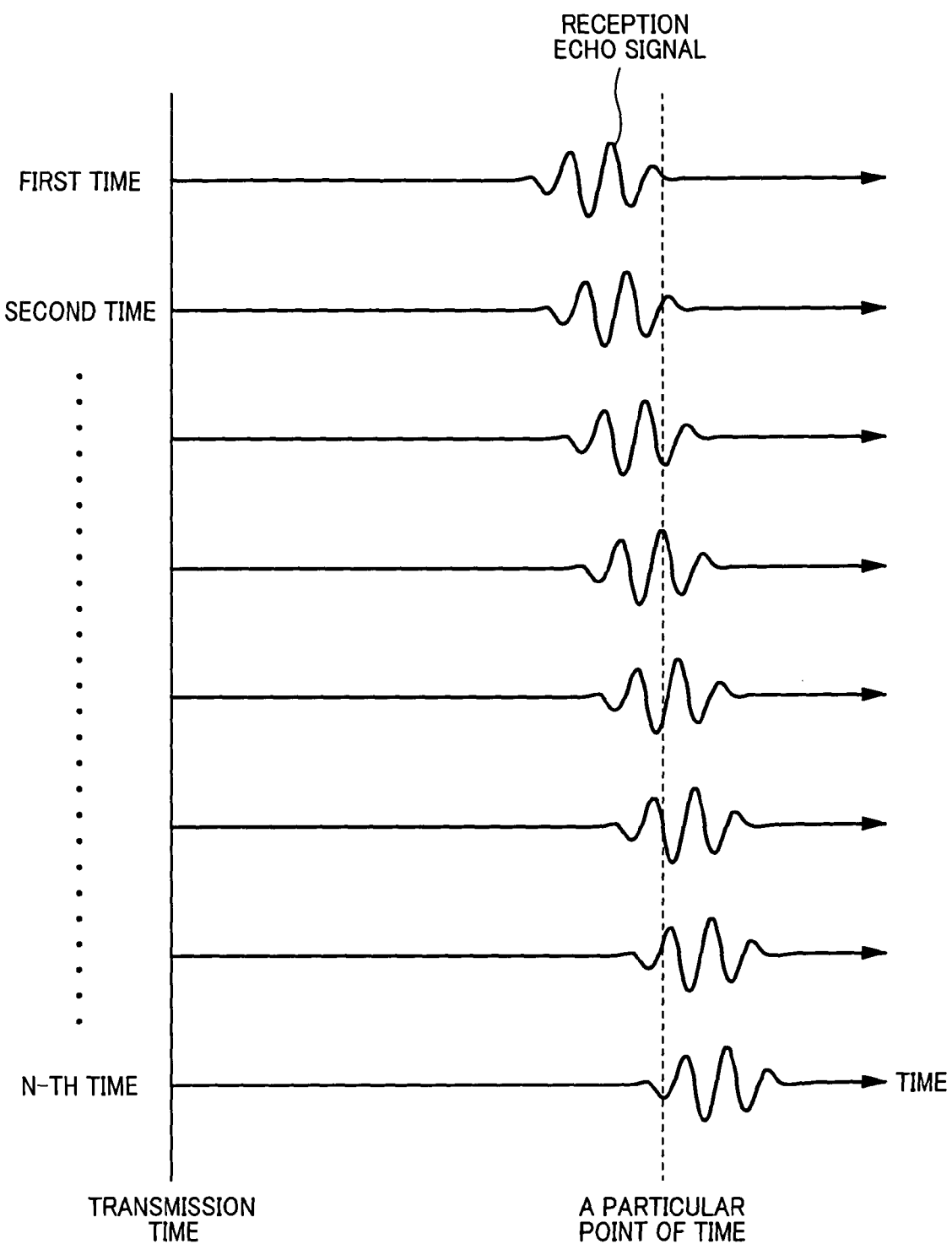
FIG. 1 is a diagram showing reception signals of pulse transmissions of N times, which are arranged in order.
Figure 2:
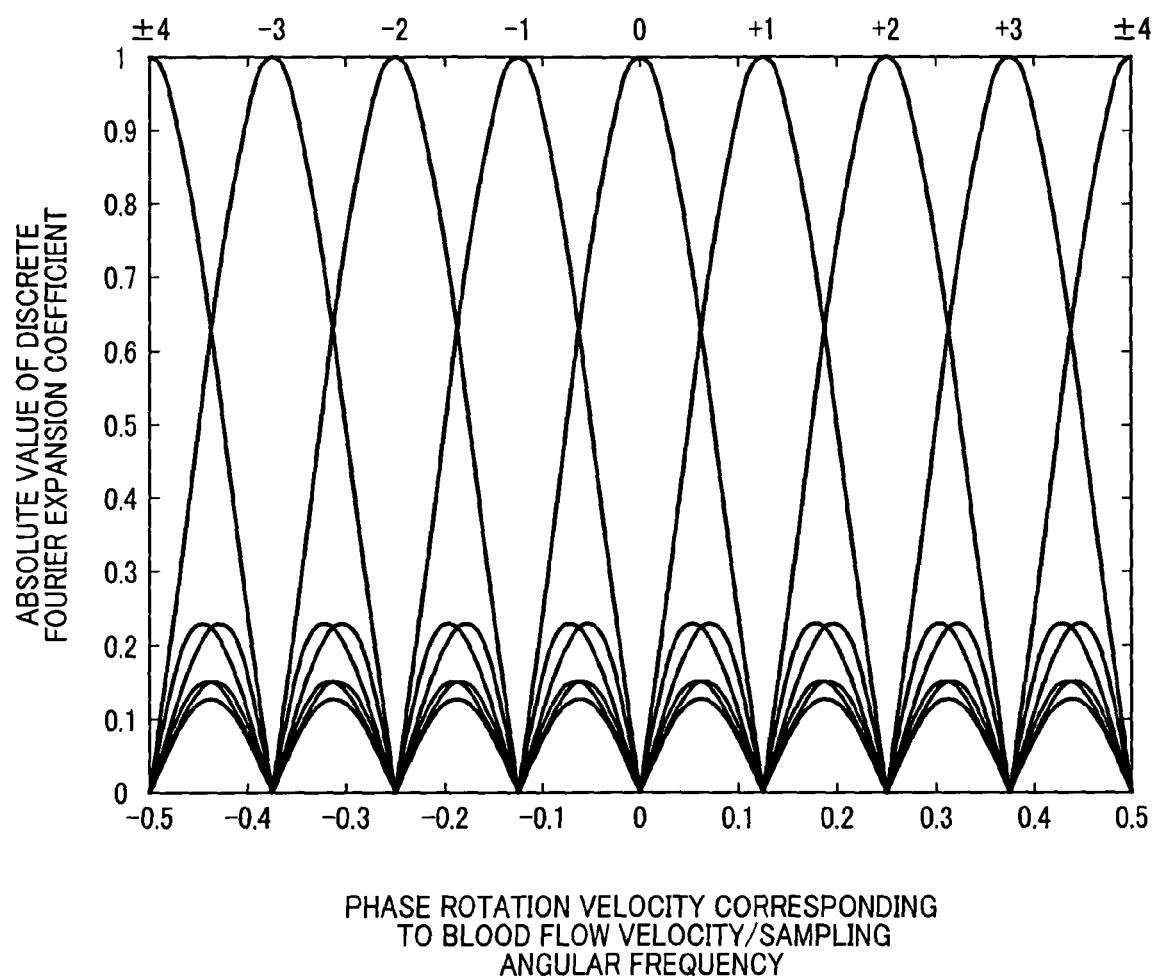
FIG. 2 is a diagram showing absolute values of discrete Fourier expansion coefficients as signed frequency functions corresponding to velocities.
Figure 3:
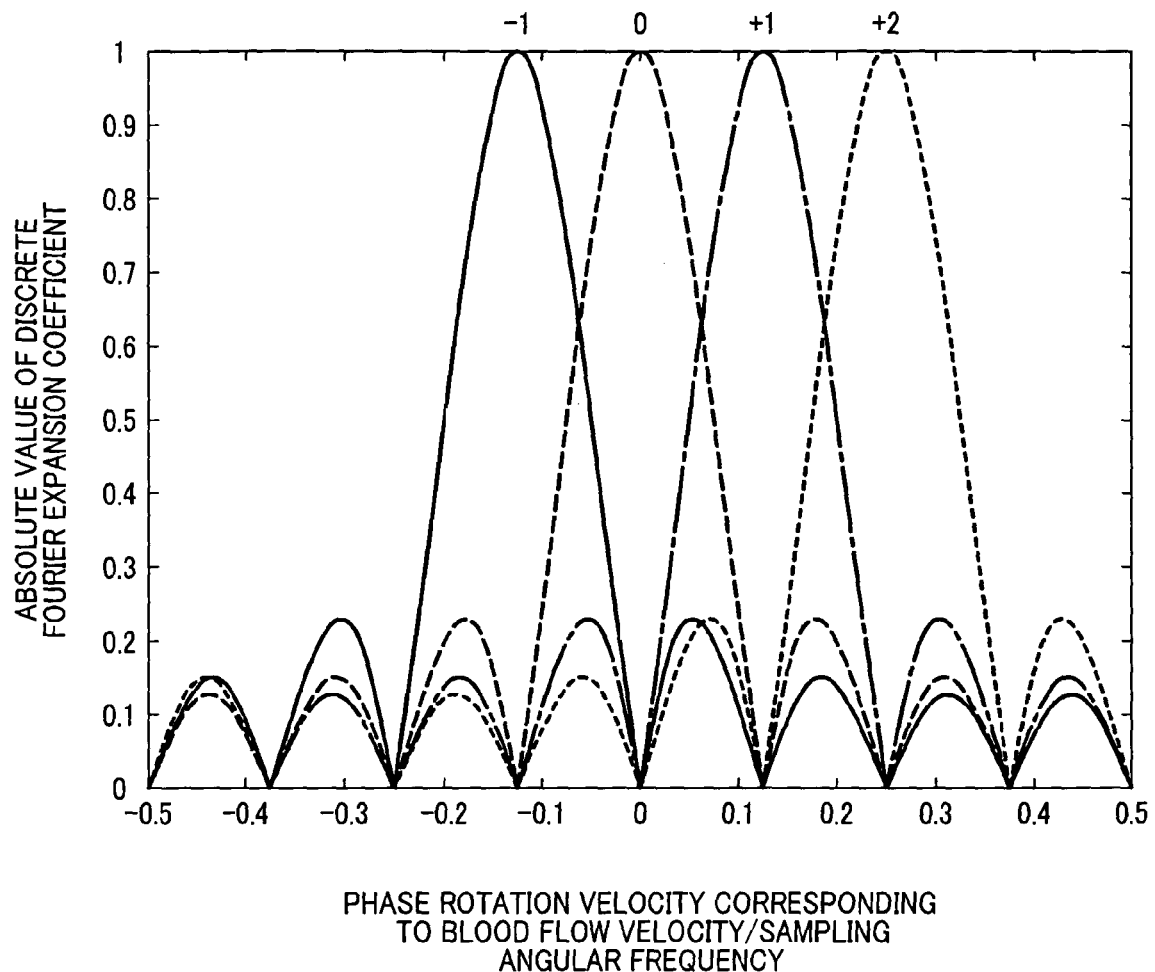
FIG. 3 is a diagram showing absolute values of four discrete Fourier expansion coefficients in FIG. 2 as signed frequency functions corresponding to velocities.
Figure 4:
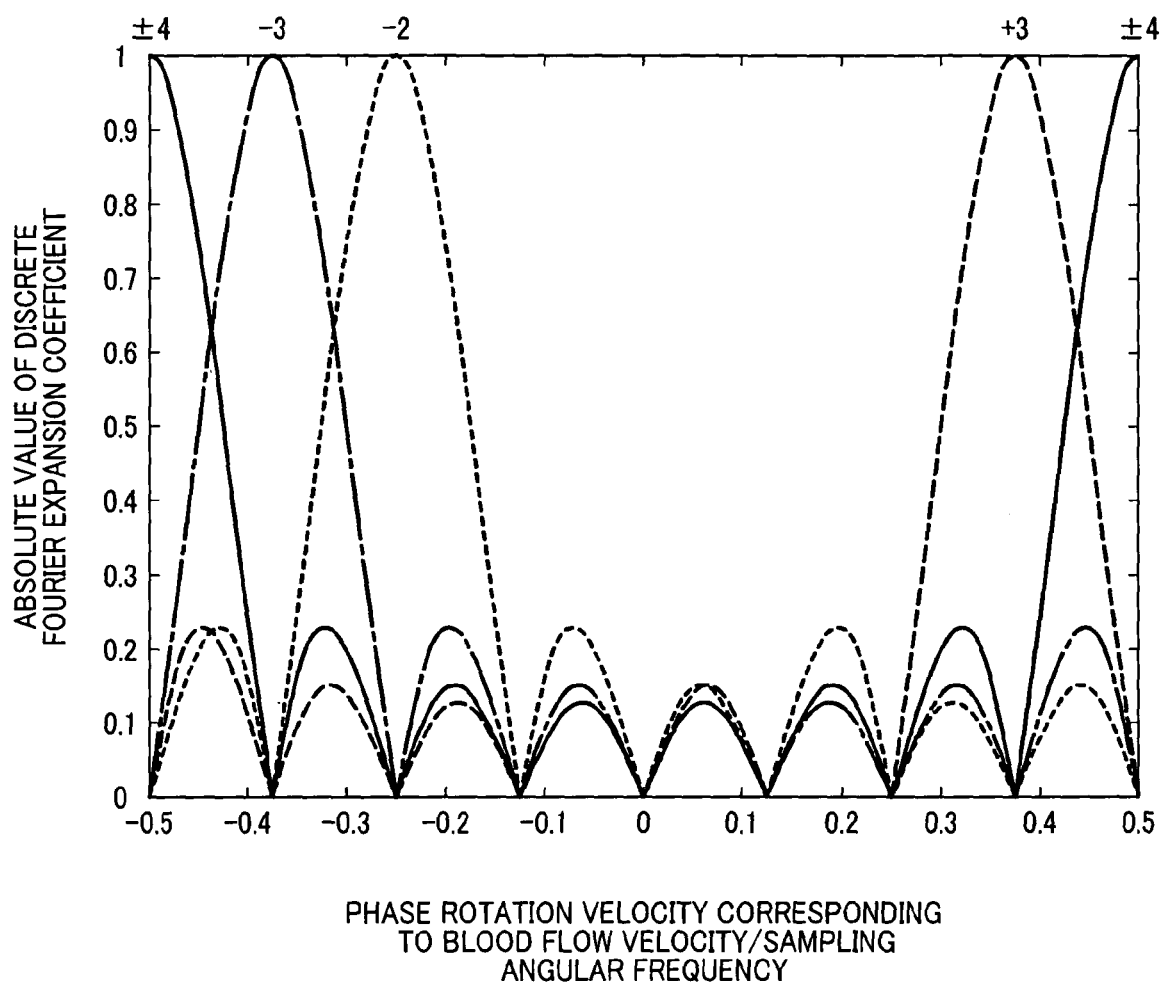
FIG. 4 is a diagram showing absolute values of the other four discrete Fourier expansion coefficients in FIG. 2, as signed frequency functions corresponding to velocities.
Figure 5:
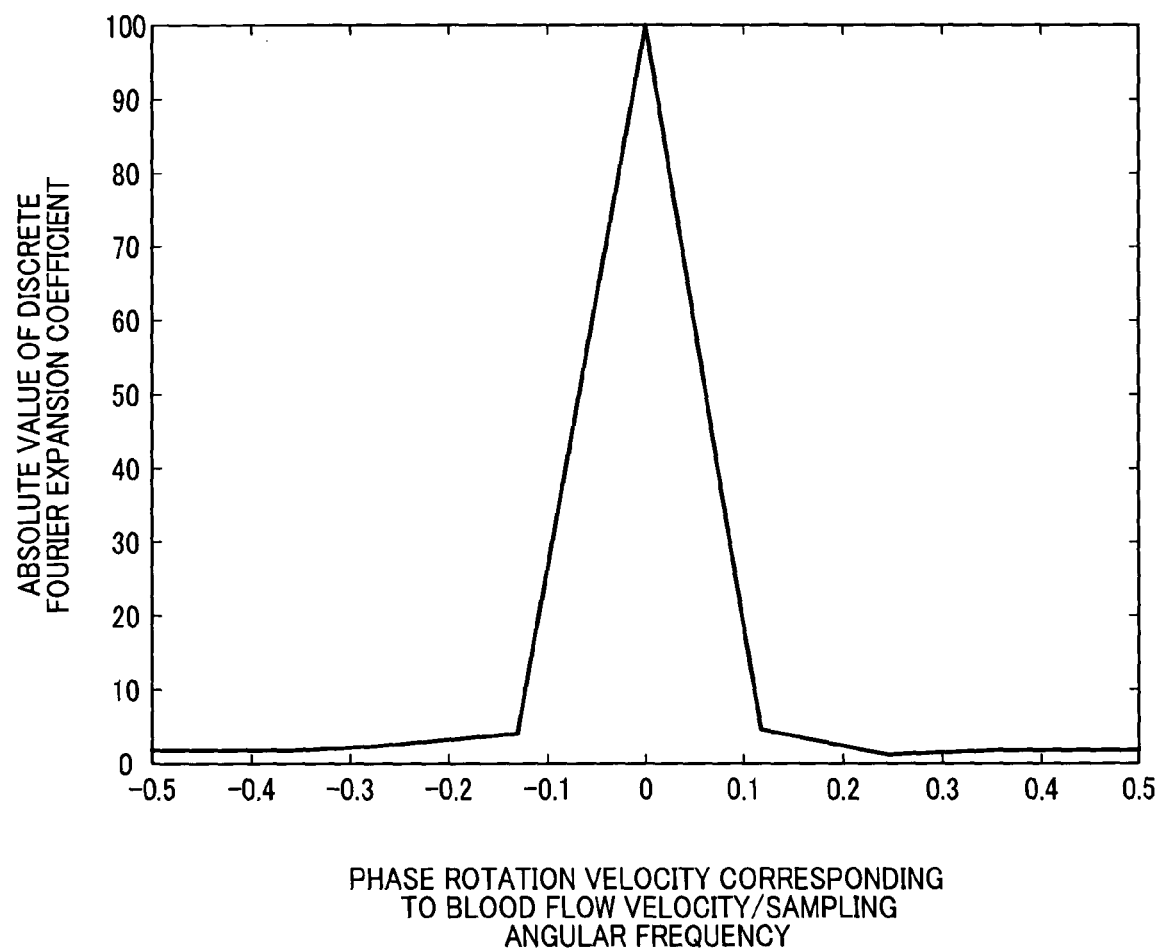
FIG. 5 is a diagram showing an example of velocity spectrum coefficients in a velocity analysis using discrete Fourier expansion.
Figure 6:
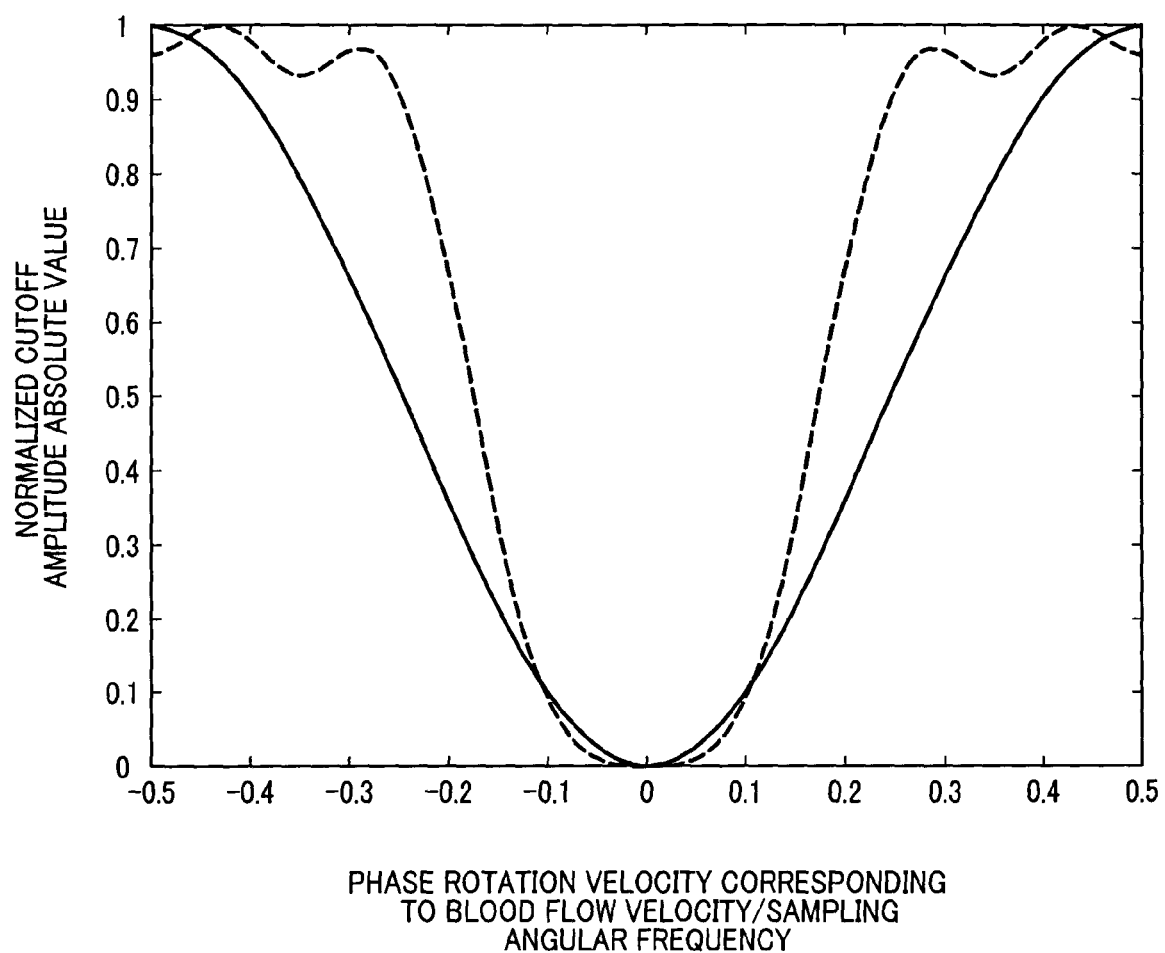
FIG. 6 is a diagram showing a typical example of pass amplitude characteristics of a conventional low-frequency cutoff type MTI filter (solid line) and a polynomial regression filter (broken line)
Figure 7:
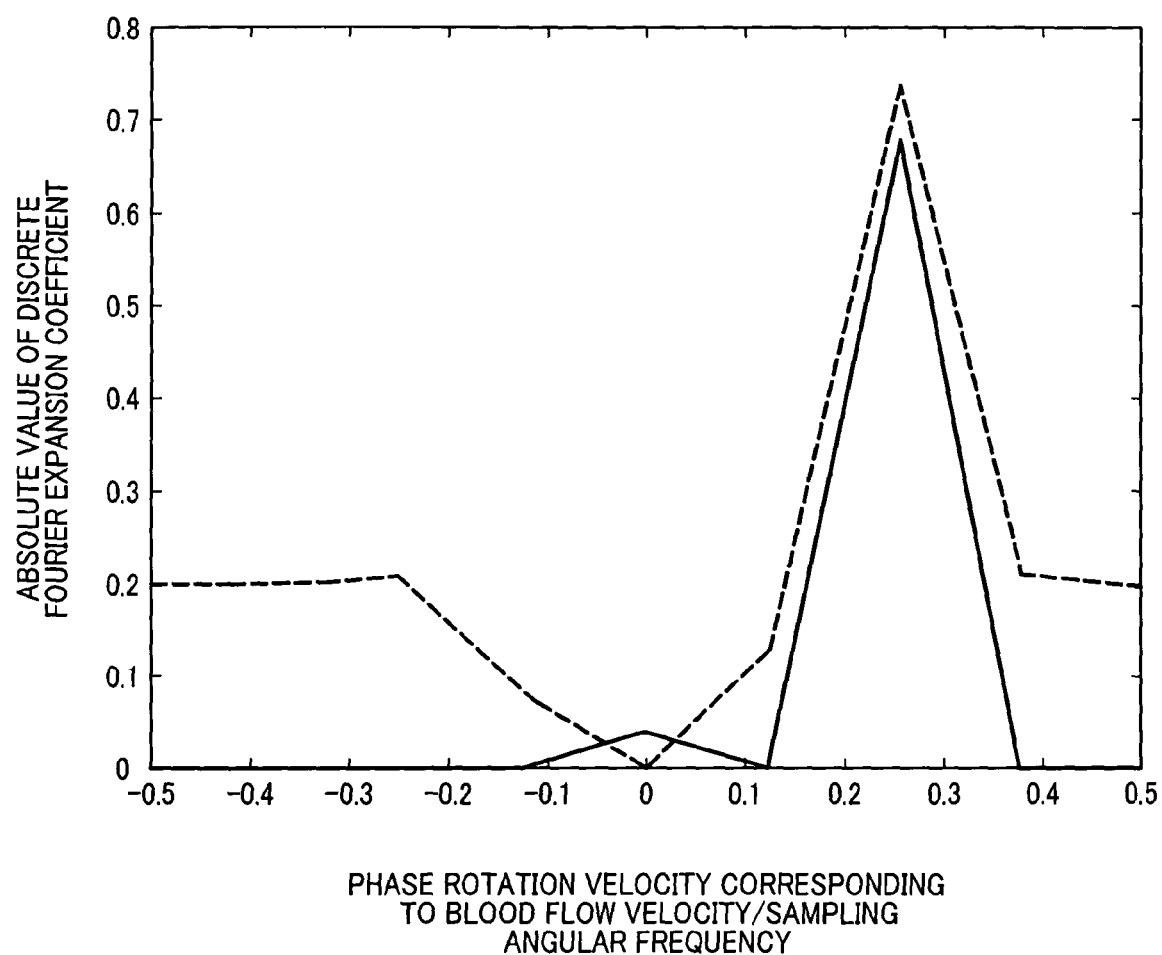
FIG. 7 is a diagram showing an example of velocity spectrum coefficients obtained in the case where signals are passed to a conventional low-frequency cutoff type MTI filter (solid line) and the polynomial regression filter (broken line) and, after that, a velocity analysis using discrete Fourier expansion is performed.

An operation example of the Doppler velocity detecting/analyzing device of the present invention will be described in comparison with the conventional method. It was assumed that the amplitude of a clutter echo signal is 300 times as large as that of a blood flow echo signal, and the clutter velocity increases at a predetermined accelerated velocity from an initial value of zero. A numerical calculation simulation was conducted with respect to the case where the number N of time-series signals is eight (N =8), and a comparison was made. As the conventional method, a low-frequency cutoff filter in the case of FIG. 6 was used as an MTI filter and a process of calculating velocity was performed by the blood flow signal detector/analyzer 16 in a manner similar to the method of obtaining the phase rotation amount average value Pa by using the equation (5) at a post stage. Further, the present invention was also compared with the case where the MTI filter is replaced with the polynomial regression filter as shown in FIG. 5. In this case, the cutoff degree M was controlled in accordance with an output signal of the phase rotation detector 15 in a manner similar to the method of the present invention.

Figure 21:
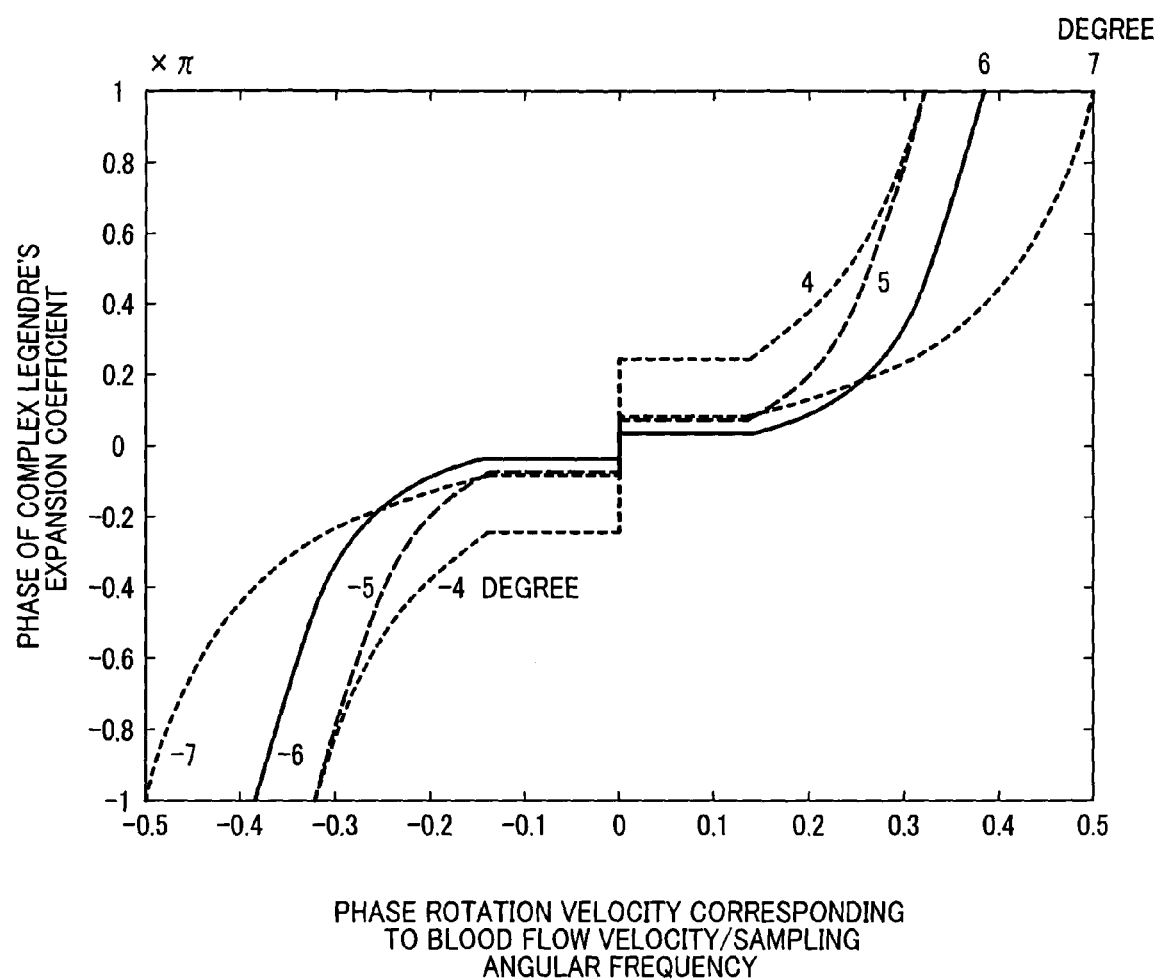
FIG. 21 is a diagram showing calibration curves between the phase of the complex Legendre expansion coefficient whose portion around the origin is corrected and velocity.

With respect to the problem in the velocity range of the absolute values smaller than the absolute value of a velocity whose maximum is A(M), the origin portion of the velocity calibration curve shown as an example in FIG. 20 was corrected so that all of velocity outputs in the range become zero, and a velocity detection/analysis was conducted with the calibration curve. FIG. 21 shows corrected calibration curves of the case where M=3as an example. Since C(±3) is discarded, a calibration curve used when $\|c(\pm 4)\|$ is the maximum is rewritten to an arc tangent function of $\|C(\pm 5)/C(\pm 4)\|$, not $\|c(\pm 5)/C(\pm 3)\|$. A control was executed so that a velocity output becomes zero in the case where the maximum value of each of the absolute values from C(±(M+2)) to C(±(N−1)) is less than $1/100$ of the assumed absolute value of a blood flow echo signal. Also in the conventional method and the case of the polynomial regression filter, it is controlled so that a velocity output becomes zero in the case where the signal amplitude as an output of an MTI filter is less than 1/100 of the assumed amplitude of the blood flow echo signal.

Figure 22:
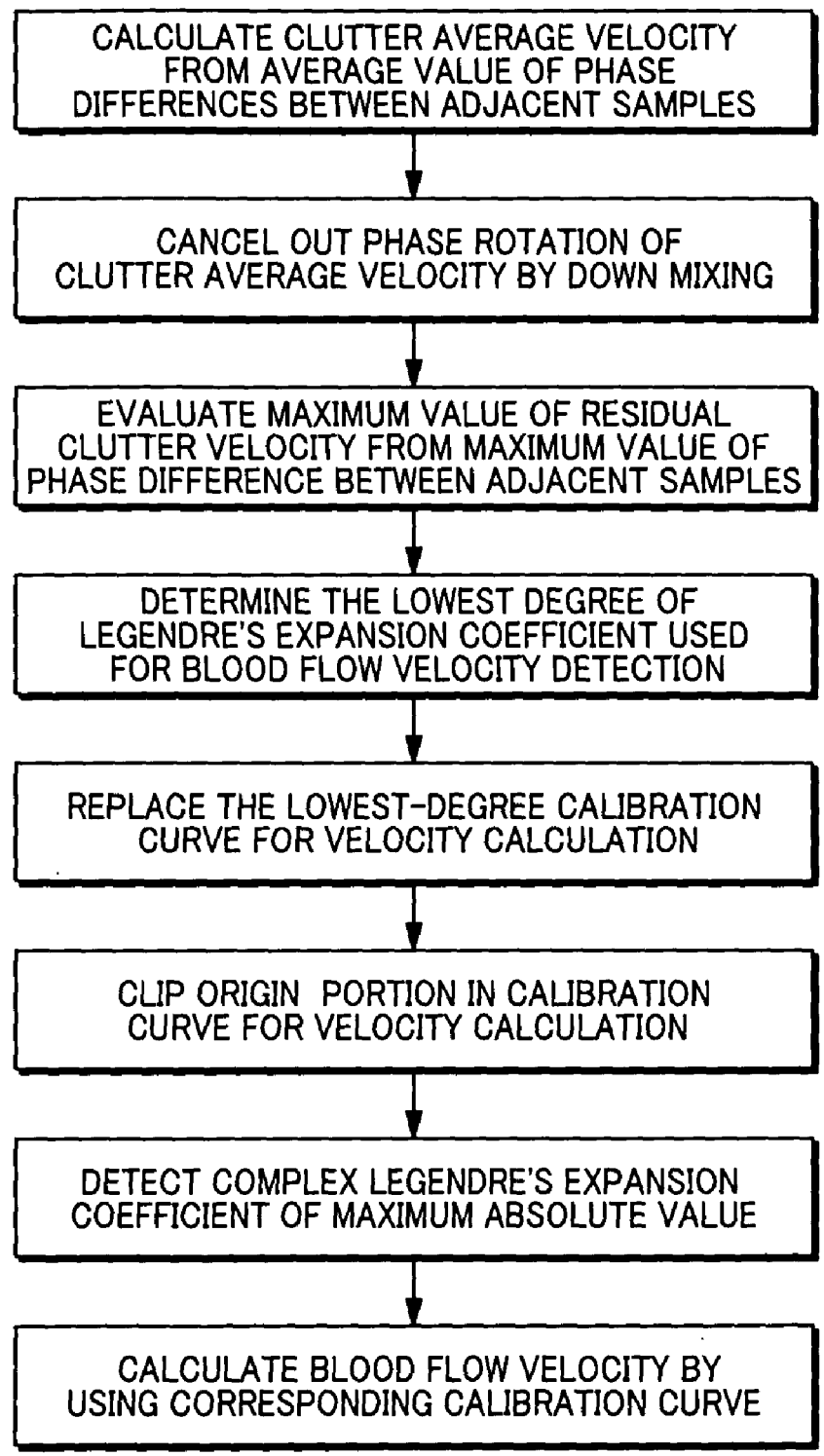
FIG. 22 is a diagram showing an example of a Doppler velocity detection algorithm of the present invention.

FIG. 22 shows the above-described velocity detection algorithm. Although the algorithm of detecting a velocity by using the phase of the complex Legendre coefficient of the maximum absolute value is shown in the diagram, there is also a method of using not only the phase of the maximum coefficient of the absolute value but also an average value of values obtained by placing weights of coefficient absolute values to velocities derived from the phases of a plurality of coefficients in order to perform more stable velocity detection. For example, when the absolute value of the complex Legendre coefficient of the $n_m$th degree (where $n_m>0$) is the maximum, an average value of values obtained by placing weights of coefficient absolute values to velocities obtained from phases of coefficients of the $n_m-1$th degree to the N−1th degree is used. When the absolute value of the complex Legendre coefficient of the $-n_m$th degree ($-n_m<0$) is the maximum, an average value of values obtained by placing weights of coefficient absolute values to velocities derived from the phases of the coefficients of the $-n_m+1$th degree to the $-N+1$th degree is used.

Figure 23:
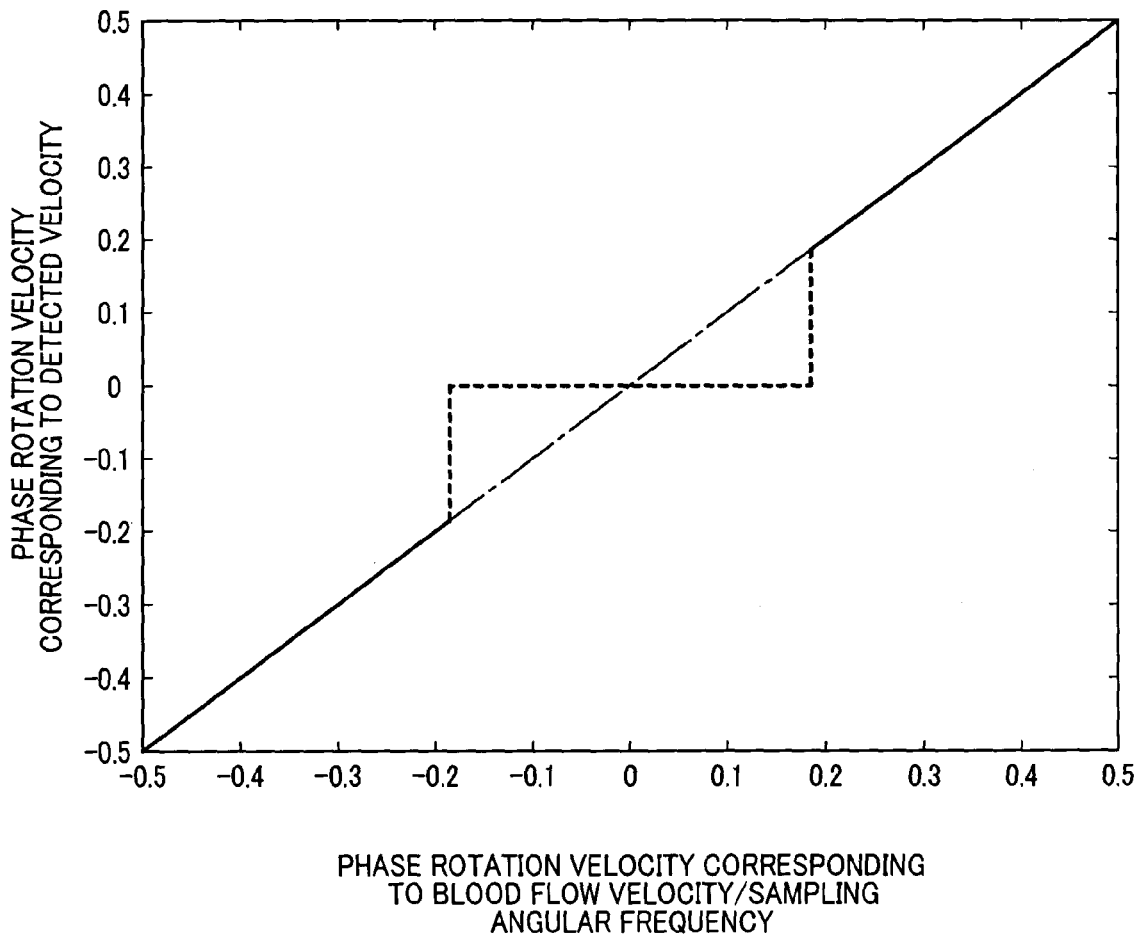
FIG. 23 is a diagram showing an example (1) of a velocity detection result of the method of the present invention.
Figure 24:
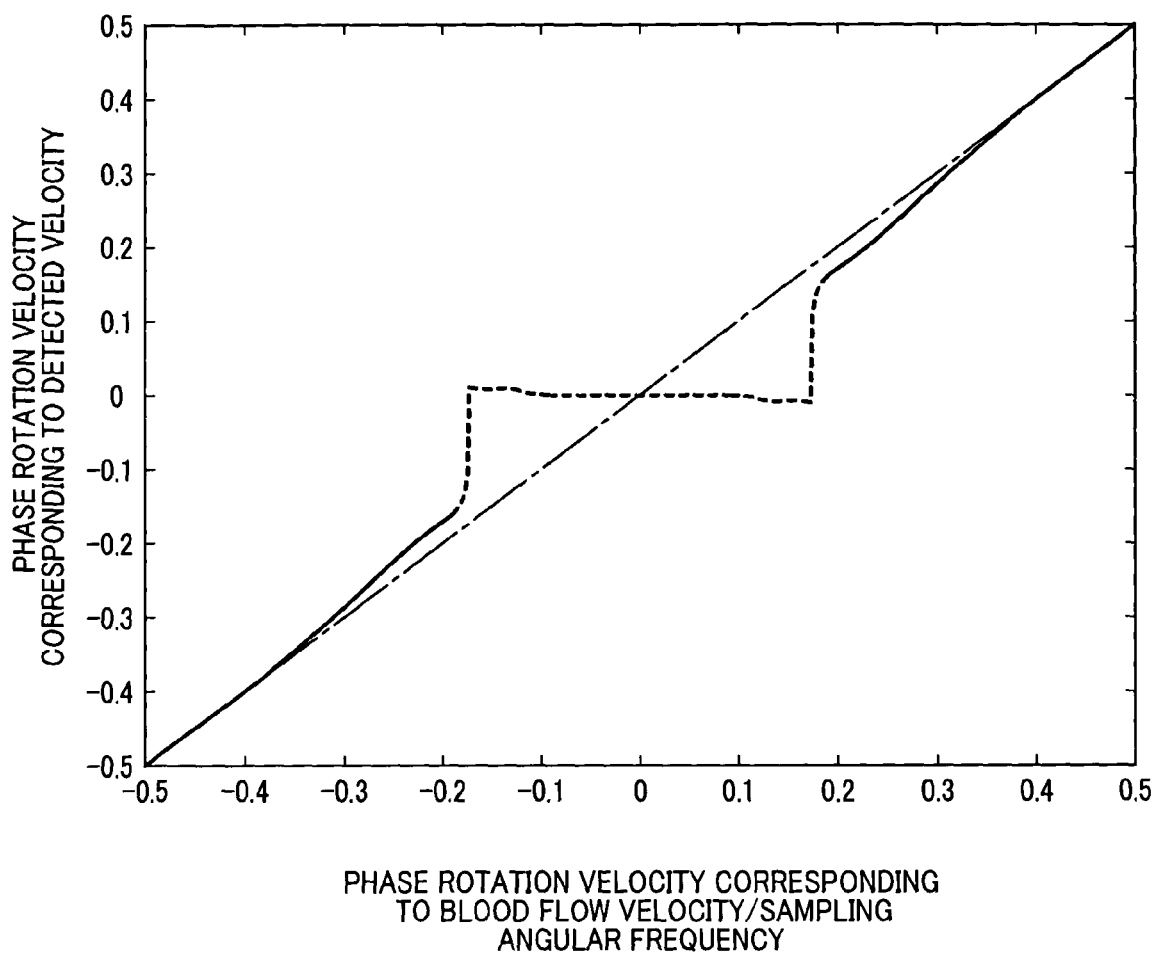
FIG. 24 is a diagram showing an example (1) of a velocity detection result of a conventional method.
Figure 25:
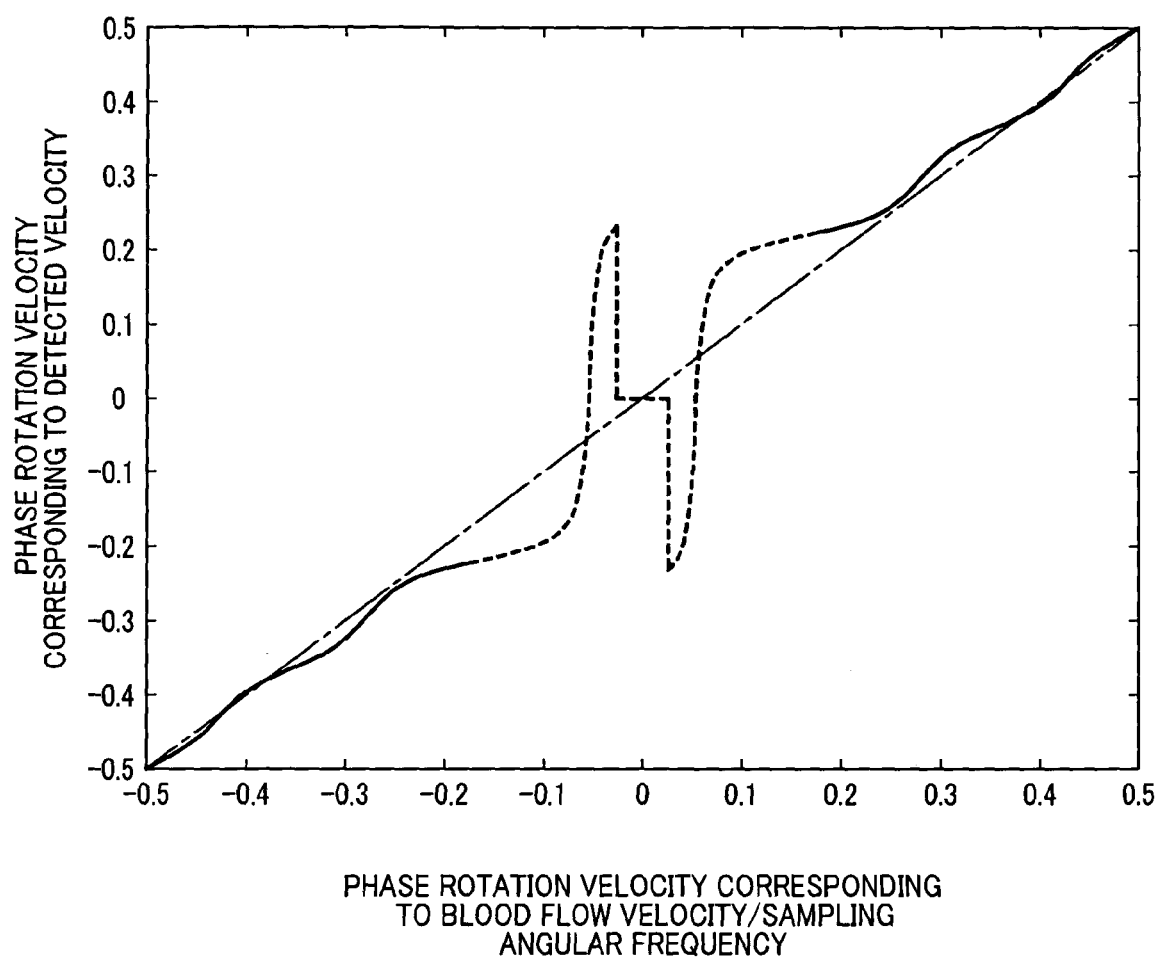
FIG. 25 is a diagram showing an example (1) of a velocity detection result of a polynomial regression filter method.

FIGS. 23, 24, and 25 show results of velocity detection according to the method of the present invention, the conventional method, and the polynomial regression filter method, respectively, of the case where the final velocity achieved of a clutter is 0.8% of the Nyquist limit velocity. The horizontal axis shows blood flow velocity as an input, and the vertical axis shows a detected velocity as an output. A valid velocity detection range is plotted by the solid line, and the outside of the range is plotted by the dot line. An ideal case is shown by an alternate long and short dash line. As shown in the diagrams, when the clutter velocity is low, an almost accurate velocity analysis result is derived from each of the methods. Particularly, an error is the smallest in the method of the present invention.

Figure 26:
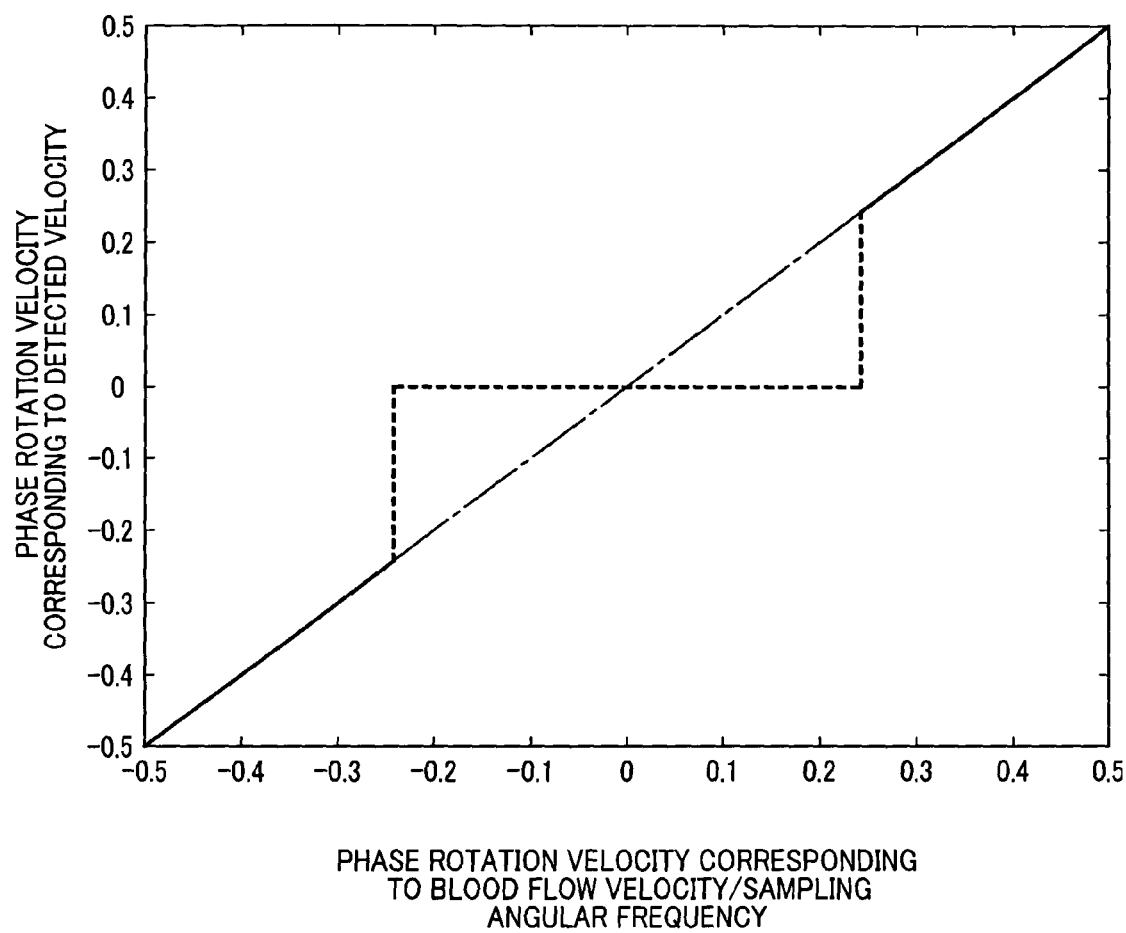
FIG. 26 is a diagram showing an example (2) of a velocity detection result of the method of the present invention.
Figure 27:
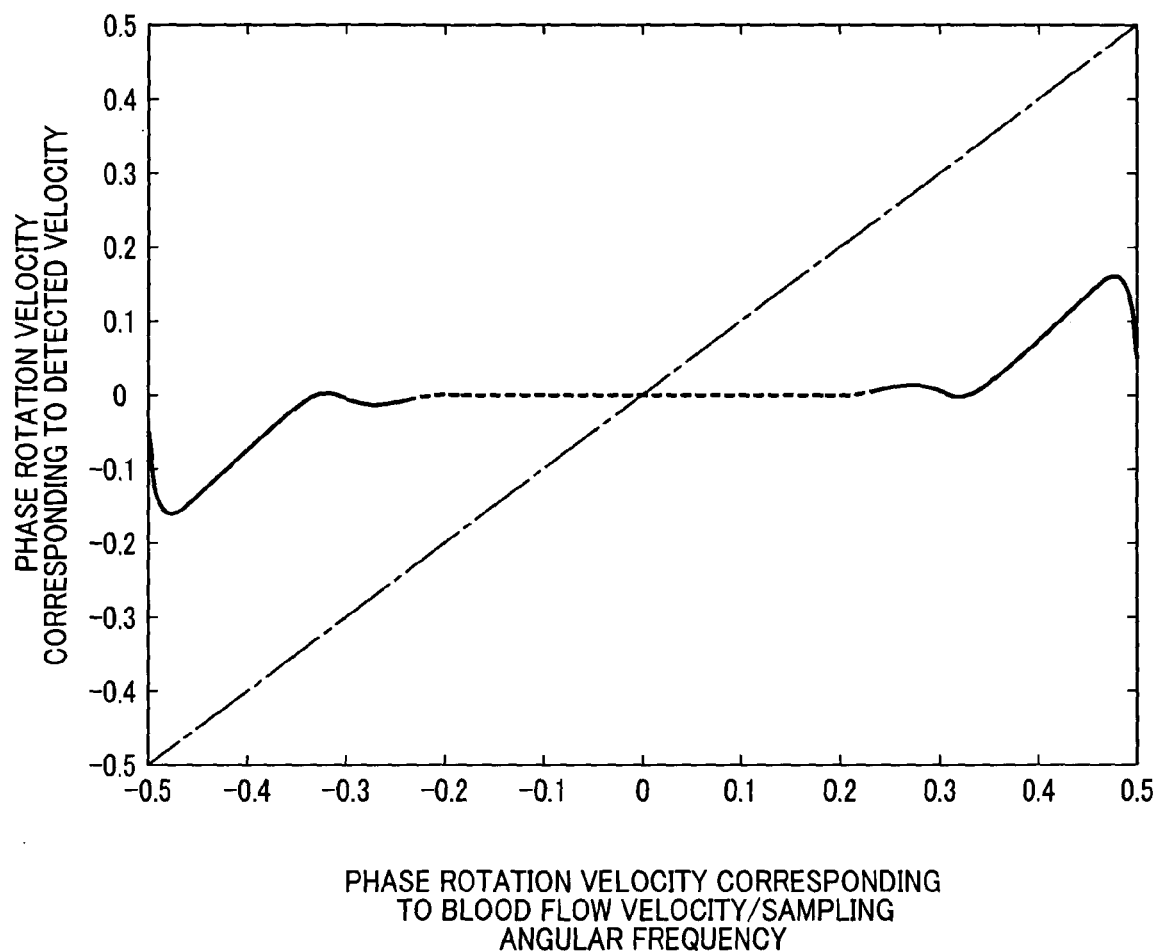
FIG. 27 is a diagram showing an example (2) of the velocity detection result of the conventional method.
Figure 28:
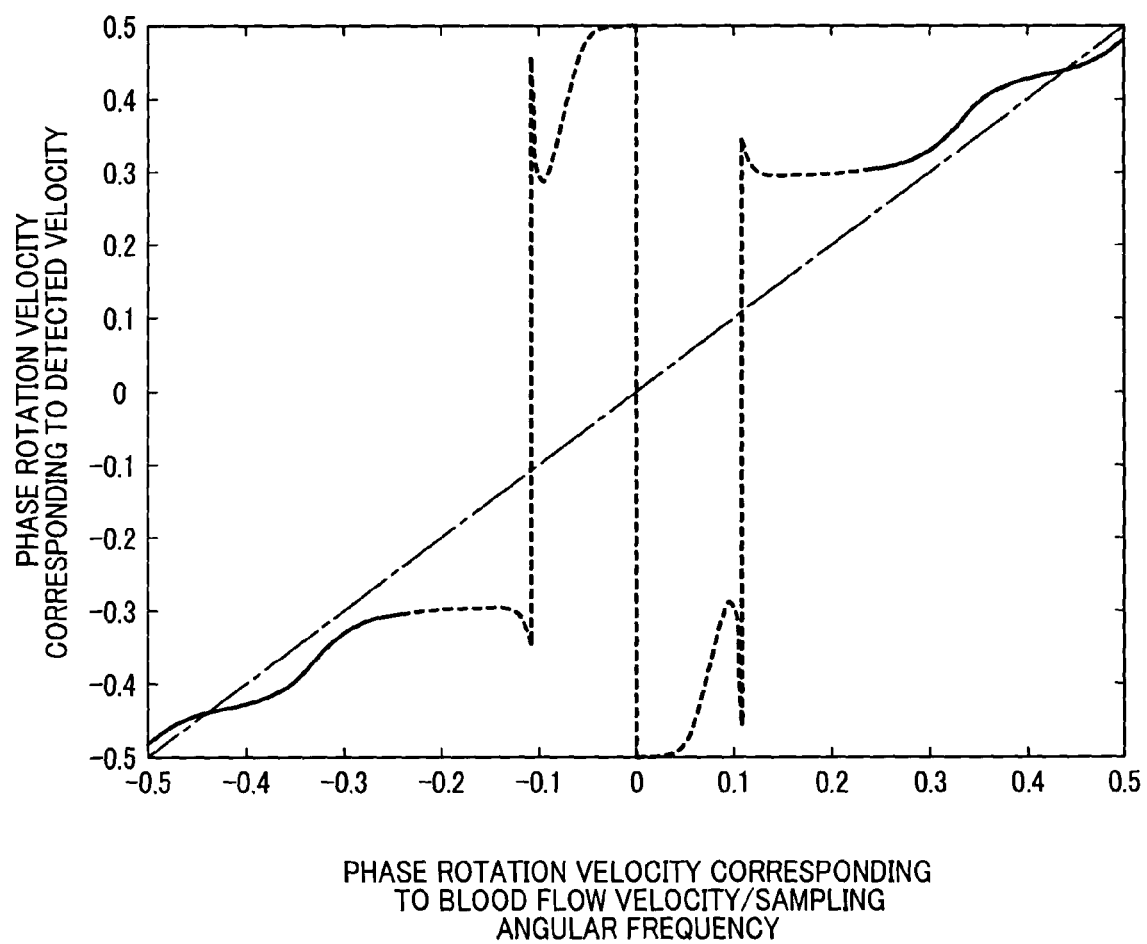
FIG. 28 is a diagram showing an example (2) of the velocity detection result of the polynomial regression filter method.

FIGS. 26, 27, and 28 similarly show results of velocity detection according to the method of the present invention, the conventional method, and the polynomial regression filter method, respectively, of the case where the final velocity achieved of a clutter is 3% of the Nyquist limit velocity. In the clutter velocity range, a velocity detection according to the conventional method almost fails. In the polynomial regression filter, although an error in the effective velocity detection range is not large, an error of the case where the blood flow velocity is smaller is large. The method cannot be used unless some countermeasure is taken. In contrast, the method of the present invention produces an accurate velocity detection result in the valid velocity detection range and, in addition, simply outputs zero as the detection velocity when the blood flow velocity is lower than the range.

The Doppler velocity detection device according to the embodiment of the invention is characterized in that, as described above, an accurate velocity detection result is output in the valid velocity detection range and, when the blood flow velocity is lower than the range, zero of the detection velocity is simply output or a message that the velocity cannot be detected is displayed.

Figure 29:
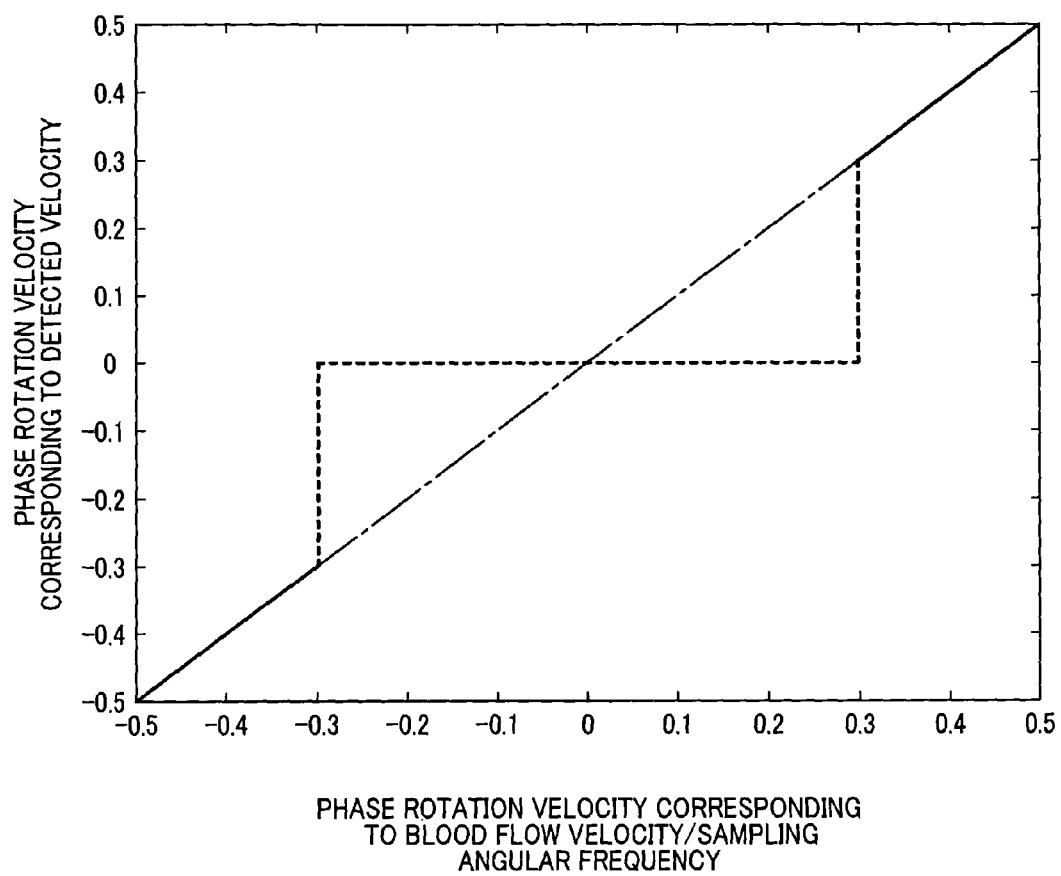
FIG. 29 is a diagram showing an example (3) of the velocity detection result of the method of the invention.
Figure 30:
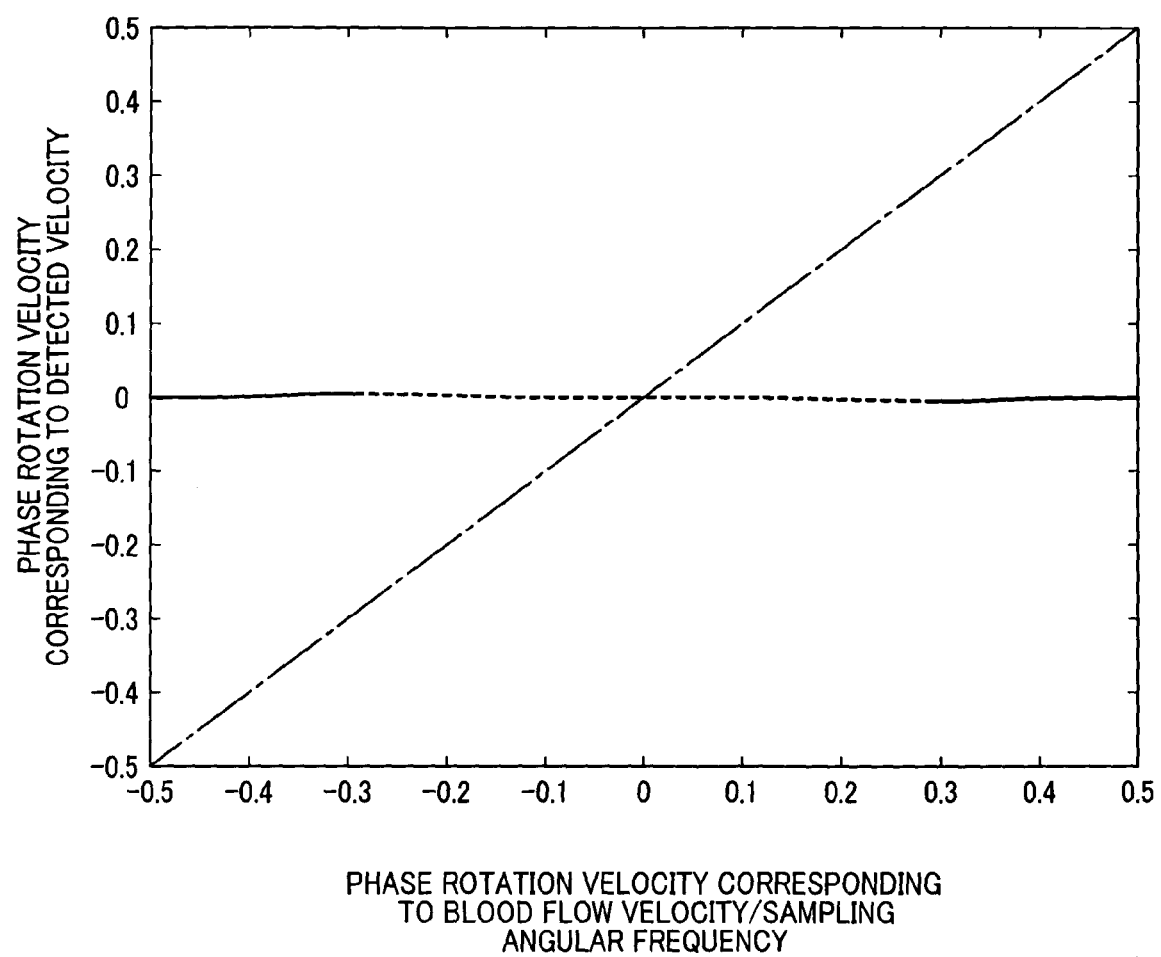
FIG. 30 is a diagram showing an example (3) of the velocity detection result of the conventional method.
Figure 31:
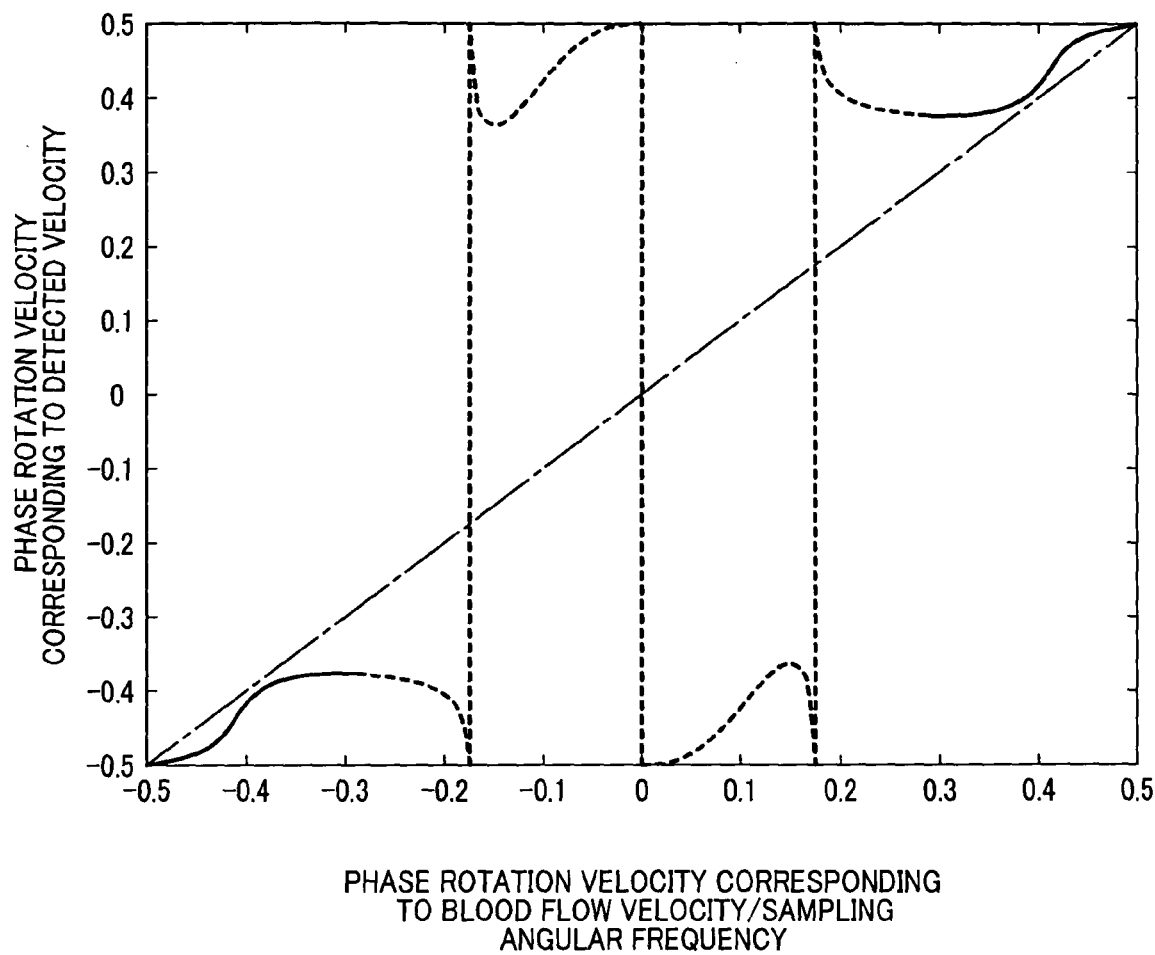
FIG. 31 is a diagram showing an example (3) of a velocity detection result by the polynomial regression filter method.

FIGS. 29, 30, and 31 similarly show results of velocity detection according to the method of the present invention, the conventional method, and the polynomial regression filter method, respectively, of the case where the final velocity achieved of a clutter is 20% of the Nyquist limit velocity. When the clutter velocity is high to the extent, velocity detection according to the conventional method completely fails. In the polynomial regression filter, an error in the effective velocity detection range increases and, simultaneously, an error in the case where the blood flow velocity is smaller is also remarkably large. In contrast, although the valid velocity detection range is slightly narrowed, the method of the present invention gives an almost accurate velocity detection result in a range where the blood velocity is equal to or higher than 60% of the Nyquist limit velocity, and an operation in the case where the blood flow velocity is lower than the range is also natural.

The case of drawing a low-velocity blood flow in a liver or kidney in which soft tissues move by breathing or the like will be described concretely. According to the present invention, the blood flow having a velocity component of 3 mm/sec or higher toward the ultrasonic probe can be drawn in a real-time manner in a state where the velocity of motion toward the ultrasonic probe of an organ changes 1 mm/sec. This blood flow velocity detectability cannot be reached by the conventional method.

According to the present invention, a blood flow can be drawn so as to be distinguished from the motion of an organ. By further utilizing the advantage, in the ultrasonographic device of FIG. 20, a clutter signal detected by the phase rotation detector 13, that is, a signal of the phase rotation velocity of an echo from an organ is input to the scan converter 19, and an image indicative of the motion velocity of the organ or a distribution of the spatial differential can be displayed so as to be superimposed on a blood flow image or by the side of the blood flow image. The usefulness of the configuration will be described by using the case of a hepatic tumor as an example. A neovascular develops in the peripheral portion of a hepatic tumor and blood blow dynamics are different from those of a normal liver around the hepatic tumor. In addition, the hardness of the hepatic tumor is different from that of the normal liver, so that motion of the tissues of the hepatic tumor is also different from that of the periphery. Therefore, display of not only a blood flow image but also variations according to sites of the motion velocity in the organ is very useful to diagnosis of a hepatic tumor.

As described above, according to the present invention, the velocity of a moving reflector such as a blood flow in a living body can be detected accurately while eliminating the influence of a clutter echo signal having an amplitude incomparably larger than that of an echo signal. Concretely, in a state where the motion velocity of an organ toward an ultrasonic probe changes at 1 mm/sec, the blood flow having a velocity component of 3 mm/sec or higher toward the ultrasonic probe can be drawn in a real time manner.

As described above, the present invention provides a novel method capable of detecting a blood flow velocity while suppressing a clutter caused by a body motion having an amplitude larger than that of the blood flow by two or three digits by using a complex Legendre expansion system capable of distinguishing the sign of a velocity between the positive and negative signs. The invention can also provide an ultrasonographic device with the blood flow detecting/drawing function which enables an accurate medial diagnosis. That is, the device to which the invention is applied is extremely useful for a medical diagnosis and, therefore, the present invention is also very significant in the industries supporting medical diagnosis.

Further, the method of the invention can also dramatically improve the moving reflector detectability of other pulse Doppler devices such as a meteorological radar for detecting and drawing a moving reflector such as a rain cloud by transmitting/receiving electromagnetic waves, an airborne radar for detecting a flying object, and a collision avoidance radar for detecting an approaching object, so that the present invention is very significant in the industry and society.

INDUSTRIAL APPLICABILITY

According to the present invention, the velocity of a moving reflector such as a blood flow in a living body can be accurately detected while suppressing the influence of a clutter echo signal having an amplitude incomparably larger than that of an echo signal.

The invention claimed is:

1. A Doppler velocity detection device comprising:
a transmit/receive unit for transmitting/receiving pulse waves to/from an object whose velocity is to be measured a plurality of times, and
a signal detector/analyzer unit for analyzing the velocity of the object whose velocity is to be measured, based on the received signals,
wherein said signal detector/analyzer unit is configured to extract reception echo signals of equal lapse time from transmission times of pulses, from a plurality of reception echo signals obtained by transmission/reception of a plurality of times, and expand the reception echo-time series signals arranged in order of the transmission times as components of a Legendre polynomial, and obtain a velocity signal of the object whose velocity is to be measured based on the magnitudes of expansion coefficients.

2. A Doppler velocity detection device according to claim 1, wherein an expansion coefficient of an even-numbered degree term and an expansion coefficient of an odd-numbered degree term which is different from the even-numbered degree term by one degree, derived when the reception echo time-series signals are expanded as components of a Legendre polynomial starting from the 0th degree, are linearly connected by using an imaginary unit as a coefficient, thereby obtaining a complex expansion coefficient, and deriving a velocity signal from the ratio between the magnitude of each complex expansion coefficient and the magnitude of an interval between the complex expansion coefficients, and wherein the velocity signal includes a sign code to distinguish between a transmission direction of the pulse waves and an opposite direction to the transmission direction.

3. A Doppler velocity detection device comprising:
means for transmitting/receiving pulse waves to/from a subject a plurality of times; and
velocity analyzing means for analyzing a velocity of a moving reflector in the subject on the basis of a reception echo signal,
wherein the velocity analyzing means is configured to obtain a complex expansion coefficient by linearly connecting an expansion coefficient of an even-numbered degree term and an expansion coefficient of an odd-numbered degree term which is different from the even-numbered degree term by one degree, derived when reception echo signals of equal lapse time extracted from pulse transmission times, from a plurality of reception echo signals obtained by transmission/reception of a plurality of times, are arranged in order of transmission time and expanded as components of a Legendre polynomial starting from the 0th degree, by using an imaginary unit as a coefficient, and obtains a velocity signal of a moving reflector in the subject based on the ratio between the magnitude of each complex expansion coefficient and the magnitude of an interval between the complex expansion coefficients, and
wherein the velocity signal includes a sign code to distinguish between a transmission direction of the pulse waves and an opposite direction to the transmission direction.

4. A Doppler velocity detection device according to claim 3, further comprising display means for two-dimensionally or three-dimensionally displaying a velocity signal of the moving reflector together with an echo signal from a stationary reflector in the subject.

5. An ultrasonographic device comprising:
an ultrasonic probe;
means for allowing the ultrasonic probe to transmit/receive ultrasonic pulse waves to/from a subject a plurality of times; and
velocity analyzing means for analyzing velocity of a moving reflector in the subject on the basis of reception echo signals from the subject,
wherein the velocity analyzing means expands reception echo signals of equal lapse time extracted from transmission times of the ultrasonic pulses, from a plurality of reception echo signals obtained by transmission/reception of a plurality of times, arranges the reception echo-time series signals in order of transmission times, expands the reception echo-time series signals as components of a Legendre polynomial, and obtains a velocity signal of the moving reflector in the subject based on the magnitude of each of the expansion coefficients.

6. An ultrasonographic device according to claim 5, wherein the velocity analyzing means is configured to obtain a complex expansion coefficient by linearly connecting an expansion coefficient of an even-numbered degree term and an expansion coefficient of an odd-numbered degree term which is different from the even-numbered degree term by one degree, derived when the reception echo time-series signals are expanded as components of a Legendre polynomial starting from the 0th degree, by using an imaginary unit as a coefficient, and configured to obtain a velocity signal based on the ratio between the magnitude of each complex expansion coefficient and the magnitude of an interval between the complex expansion coefficients, and wherein the velocity signal includes a sign code to distinguish between a transmission direction of the pulse waves and an opposite direction to the transmission direction.

7. An ultrasonographic device comprising:
an ultrasonic probe; means for allowing the ultrasonic probe to transmit/receive ultrasonic pulse waves to/from a subject a plurality of times; and
velocity analyzing means for analyzing velocity of a blood flow in a moving organ in the subject on the basis of reception echo signals from the subject,
wherein the velocity analyzing means obtains a complex expansion coefficient by linearly connecting an expansion coefficient of an even-numbered degree term and an expansion coefficient of an odd-numbered degree term which is different from the even-numbered degree term by one degree, derived when the reception echo time-series signals obtained by arranging reception echo signals of equal lapse time from transmission times of the ultrasonic pulses in order of the transmission times are expanded as components of a Legendre polynomial starting from the 0th degree, by using an imaginary unit as a coefficient, and obtains a velocity signal of the blood flow in the subject based on the ratio between the magnitude of each complex expansion coefficient and the magnitude of an interval between the complex expansion coefficients, and
wherein the velocity signal includes a sign code to distinguish between a transmission direction of the pulse waves and an opposite direction to the transmission direction.

8. An ultrasonographic device according to claim 7, further comprising display means for displaying a distribution image of a motion velocity of the organ or a spatial change in the motion velocity and a blood flow distribution image obtained simultaneously so as to be superimposed or arranged side by side.

9. An ultrasonographic device according to claim 7 or 8, wherein a blood flow having a velocity component of 3 mm/sec or higher toward the ultrasonic probe is detected and displayed while a motion velocity toward the ultrasonic probe of the organ changes by 1 mm/sec.

10. An ultrasonographic device comprising:
ultrasonic wave transmitting/receiving means for allowing a plurality of ultrasonic probes to transmit/receive an ultrasonic pulse to/from a subject a plurality of times;
a transmission beam former for controlling a transmission focal position of an ultrasonic pulse in the subject;
a reception beam former for controlling a reception focal position in the subject;
a controller for controlling the ultrasonic wave transmitting/receiving means, the transmission beam former, and the reception beam former; and
velocity analyzing means for analyzing velocity of a moving reflector in the subject on the basis of reception echo signals from the subject,
wherein the velocity analyzing means is configured to obtain a complex expansion coefficient by linearly connecting an expansion coefficient of an even-numbered degree term and an expansion coefficient of an odd-numbered degree term which is different from the even-numbered degree term by one degree, derived when reception echo signals of equal lapse time extracted from transmission times of the ultrasonic pulses, from a plurality of reception echo signals obtained by transmission/reception of a plurality of times, are arranged in order of transmission time and expanded as components of a Legendre polynomial starting from the 0th degree, by using an imaginary unit as a coefficient, and configured to obtain a velocity signal of the moving reflector in the subject based on the ratio between the magnitude of each complex expansion coefficient and the magnitude of an interval between the complex expansion coefficients, and
wherein the velocity signal includes a sign code to distinguish between a transmission direction of the pulse waves and an opposite direction to the transmission direction.

* * * * *